(12) United States Patent
Xian et al.

(10) Patent No.: US 12,089,311 B2
(45) Date of Patent: Sep. 10, 2024

(54) APPARATUSES AND METHODOLOGIES FOR FLICKER CONTROL

(71) Applicant: HAND HELD PRODUCTS, INC., Charlotte, NC (US)

(72) Inventors: Tao Xian, Mount Laurel, NJ (US); Ka Man Au, Philadelphia, PA (US); David M. Wilz, Sewell, NJ (US); Gennady Germaine, Cherry Hill, NJ (US); Patrick Anthony Giordano, Glassboro, NJ (US); Erik Van Horn, Ocean View, NJ (US); Michael Vincent Miraglia, Hamilton, NJ (US); Benjamin Hejl, Cherry Hill, NJ (US); Thomas A. Sweet, Snohomish, WA (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 18/462,977

(22) Filed: Sep. 7, 2023

(65) Prior Publication Data
US 2023/0422380 A1 Dec. 28, 2023

Related U.S. Application Data

(63) Continuation of application No. 17/807,622, filed on Jun. 17, 2022, now Pat. No. 11,792,904, which is a
(Continued)

(51) Int. Cl.
*H05B 47/125* (2020.01)
*G06V 10/141* (2022.01)
(Continued)

(52) U.S. Cl.
CPC ......... *H05B 47/125* (2020.01); *G06V 10/141* (2022.01); *H04N 23/74* (2023.01); *H04N 23/745* (2023.01)

(58) Field of Classification Search
CPC .... H04N 5/2357; H04N 23/745; H04N 23/74; H04N 5/2354; G06V 10/141; H05B 47/125
See application file for complete search history.

(56) References Cited

U.S. PATENT DOCUMENTS 5,992,744 A 11/1999 Smith et al.
6,053,408 A 4/2000 Stoner
(Continued)

FOREIGN PATENT DOCUMENTS

CA 2633437 A1 12/2008
CN 101996305 A 3/2011
(Continued)

OTHER PUBLICATIONS

U.S. Appl. No. 17/807,622, filed Jun. 17, 2022, U.S. Pat. No. 11,792,904, Issued.
(Continued)

*Primary Examiner* — Nicholas G Giles
(74) *Attorney, Agent, or Firm* — Alston & Bird LLP

(57) ABSTRACT

Various embodiments described herein provide implementations for controlling flicker, for example caused by a plurality of light sources, in a multi-sensor environment. Various embodiments provided utilize a broadest illuminator source for capturing image data objects for processing. The broadest illuminator source minimizes the number of activation changes required between the various illuminator sources. One example embodiment includes activating a broadest illuminator source of a plurality of illuminator sources; determining, based on a plurality of image sensors and an sensor activation sequence, a chosen image sensor of the plurality of image sensors for an image processing operation; and activating a chosen illuminator source of the
(Continued)

plurality of illuminator sources, the chosen illuminator source associated with the chosen image sensor.

20 Claims, 10 Drawing Sheets

Related U.S. Application Data continuation of application No. 17/234,314, filed on Apr. 19, 2021, now Pat. No. 11,394,891, which is a continuation of application No. 16/684,468, filed on Nov. 14, 2019, now Pat. No. 11,019,276.

(51) Int. Cl.
*H04N 23/74* (2023.01)
*H04N 23/745* (2023.01)

(56) References Cited

U.S. PATENT DOCUMENTS

| | | | |
|---|---|---|---|
| 6,060,722 A | 5/2000 | Havens et al. | |
| 7,195,164 B2 | 3/2007 | Patel | |
| 7,219,843 B2 | 5/2007 | Havens et al. | |
| 7,234,641 B2 | 6/2007 | Olmstead | |
| 7,533,819 B2 | 5/2009 | Barkan et al. | |
| 7,724,280 B2 | 5/2010 | Gin et al. | |
| 7,918,398 B2 | 4/2011 | Li et al. | |
| 8,027,531 B2 * | 9/2011 | Wilburn | H04N 23/90 348/51 |
| 8,152,069 B2 | 4/2012 | Kearney | |
| 8,292,183 B2 | 10/2012 | Li et al. | |
| 8,295,601 B2 | 10/2012 | Bremer et al. | |
| 8,596,542 B2 | 12/2013 | Havens et al. | |
| 8,608,071 B2 | 12/2013 | Liu et al. | |
| 8,783,573 B2 | 7/2014 | Havens et al. | |
| 8,794,526 B2 | 8/2014 | Wang et al. | |
| 9,413,989 B2 | 8/2016 | Cole et al. | |
| 9,743,010 B1 | 8/2017 | Edwards | |
| 9,996,720 B2 | 6/2018 | Wang et al. | |
| 11,019,276 B1 | 5/2021 | Xian et al. | |
| 2003/0222147 A1 | 12/2003 | Havens et al. | |
| 2011/0073652 A1 | 3/2011 | Vinogradov et al. | |
| 2012/0132457 A1 | 5/2012 | Tai et al. | |
| 2012/0236175 A1 | 9/2012 | Kinrot | |
| 2013/0064531 A1 * | 3/2013 | Pillman | H04N 23/56 396/62 |
| 2013/0207544 A1 | 8/2013 | Kaskey et al. | |
| 2014/0168443 A1 * | 6/2014 | Aguilar | H04N 23/45 348/158 |
| 2014/0340572 A1 * | 11/2014 | Sato | H04N 23/74 348/370 |
| 2015/0331107 A1 | 11/2015 | Galera et al. | |
| 2017/0070726 A1 | 3/2017 | Goldentouch et al. | |
| 2018/0182111 A1 | 6/2018 | Shinohara et al. | |
| 2019/0005286 A1 | 1/2019 | Suman et al. | |
| 2019/0068892 A1 * | 2/2019 | Yasutake | H04N 23/55 |
| 2019/0205583 A1 | 7/2019 | Bruni et al. | |

FOREIGN PATENT DOCUMENTS

| | | |
|---|---|---|
| CN | 102292980 A | 12/2011 |
| CN | 102324014 A | 1/2012 |
| CN | 102972029 A | 3/2013 |
| CN | 104041191 A | 9/2014 |
| CN | 105718837 A | 6/2016 |
| CN | 110285788 A | 9/2019 |
| EP | 2000951 A1 | 12/2008 |
| EP | 2284766 A1 | 2/2011 |
| EP | 2385481 A1 | 11/2011 |
| EP | 3035232 A1 | 6/2016 |

OTHER PUBLICATIONS

U.S. Appl. No. 17/234,314, filed Apr. 19, 2021, U.S. Pat. No. 11,394,891, Issued.
U.S. Appl. No. 16/684,468, filed Nov. 14, 2019, U.S. Pat. No. 11,019,276, Issued.
CN Notice of Allowance Mailed on Oct. 18, 2023 for CN Application No. 202011282318, 5 page(s).
CN Office Action Mailed on Jan. 19, 2023 for CN Application No. 202011282318.
CN Office Action Mailed on Jul. 17, 2023 for CN Application No. 202011282318, 8 page(s).
Corrected Notice of Allowability (PTOL-37) Mailed on Oct. 6, 2020 for U.S. Appl. No. 16/684,468.
English translation of CN Notice of Allowance dated Oct. 18, 2023 for CN Application No. 202011282318, 3 page(s).
English Translation of CN Office Action dated Jul. 17, 2023 for CN Application No. 202011282318, 10 page(s).
English Translation of CN Office Action Mailed on Jan. 19, 2023 for CN Application No. 202011282318.
EP Office Action Mailed on Dec. 16, 2022 for EP Application No., 20206541.3.
European search report Mailed on Apr. 6, 2021 for EP Application No., 20206541.3.
European Search Report Mailed on Apr 6, 2021for EP Application No. 20206541.3, 9 page(s).
Non-Final Office Action Mailed on Oct. 26, 2021 for U.S. Appl. No. 17/234,314.
Non-Final Rejection Mailed on Feb. 16, 2023 for U.S. Appl. No. 17/807,622.
Notice of Allowance and Fees Due (PTOL-85) Mailed on Apr. 20, 2021 for U.S. Appl. No. 16/684,468.
Notice of Allowance and Fees Due (PTOL-85) Mailed on Aug. 23, 2023 for U.S. Appl. No. 17/807,622, 2 page(s).
Notice of Allowance and Fees Due (PTOL-85) Mailed on Jan. 22, 2021 for U.S. Appl. No. 16/684,468.
Notice of Allowance and Fees Due (PTOL-85) Mailed on Jun. 7, 2023 for U.S. Appl. No. 17/807,622, 9 page(s).
Notice of Allowance and Fees Due (PTOL-85) Mailed on Mar. 16, 2022 for U.S. Appl. No. 17/234,314.
Notice of Allowance and Fees Due (PTOL-85) Mailed on Oct. 2, 2020 for U.S. Appl. No. 16/684,468.
Office Action for EP Application No. 20206541.3 dated Dec. 16, 2022 (5 pages).
U.S. Patent Application filed on Jun. 4, 2008 for U.S. Appl. No. 12/132,457.
U.S. Provisional Application filed on Jun. 4, 2007 for U.S. Appl. No. 60/933,022.

* cited by examiner

APPARATUSES AND METHODOLOGIES FOR FLICKER CONTROL

CROSS-REFERENCE TO RELATED APPLICATIONS

This application is a continuation of U.S. patent application Ser. No. 17/807,622 filed Jun. 17, 2022 titled "Apparatuses And Methodologies For Flicker Control," which a continuation of U.S. patent application Ser. No. 17/234,314 filed Apr. 19, 2021 (now U.S. Pat. No. 11,394,891) titled "Apparatuses And Methodologies For Flicker Control," which is a continuation of U.S. patent application Ser. No. 16/684,468 filed Nov. 14, 2019 (now U.S. Pat. No. 11,019,276) titled "Apparatuses And Methodologies For Flicker Control," the entire disclosures of which are incorporated herein by reference.

TECHNOLOGICAL FIELD

Embodiments of the present disclosure generally relate to flicker control and, specifically, to flicker control in a multi-sensor and/or multi-illuminator source environment, such as a dimensioner, scanner (e.g., a barcode scanner), and/or the like.

BACKGROUND

A multi-sensor imaging apparatus may include a plurality of image sensors, where each image sensor is associated with a corresponding illuminator source. Each illuminator source may be differently optimized to efficiently illuminate the field of view for a corresponding sensor associated with the image sensor (e.g., a first illuminator source specially configured to illuminate a field of view associated with a first image sensor, a second illuminator source specially configured to illuminate a second field of view associated with a second image sensor, and the like). Conventional apparatuses may cycle amongst the image sensors to capture image data, and when cycling activate the illuminator source associated with the image sensor to be activated. Such cycling may be utilized, for example, when searching for the image sensor to be chosen in use for a particular image processing operation to be performed. The activation and deactivation of the plurality of illuminator sources during such processes produces light pulses that result in a frequency perceivable by human observers, which causes such human observers to perceive an irritating and potentially harmful "flicker." Applicant has discovered problems with current imaging apparatuses and corresponding implementations for flicker control, and through applied effort, ingenuity, and innovation, Applicant has solved many of these identified problems by developing embodied in the present disclosure, which are described in detail below.

BRIEF SUMMARY

In general, embodiments of the present disclosure provided herein include methods, apparatuses and computer program products for flicker control in a multi-sensor environment. Other apparatuses, methods, computer program products, and features will be, or will become, apparent to one with skill in the art upon examination of the following figures and detailed description. It is intended that all such additional apparatuses, methods, computer program product, and features be included within this description be within the scope of the disclosure, and be protected by the following claims.

In accordance with one aspect of the present disclosure, a computer-implemented method for flicker control in a multi-sensor environment is provided. The computer-implemented method may be performed via a processor, and/or supporting hardware, and/or various computing hardware implementations as described below. In at least one example embodiment, the computer-implemented method includes activating a broadest illuminator source of a plurality of illuminator sources, wherein the broadest illuminator source produces a broadest illumination pattern having a greatest horizontal size of a plurality of illumination patterns projected via the plurality of illuminator sources. The example computer-implemented method further includes determining, based on a plurality of image sensors and an sensor activation sequence, a chosen image sensor of the plurality of image sensors for an image processing operation. The example computer-implemented method further includes activating a chosen illuminator source of the plurality of illuminator sources, the chosen illuminator source associated with the chosen image sensor.

Additionally or alternatively, in at least some embodiments of the example computer-implemented method, the computer-implemented method further includes initializing the sensor activation sequence associated with the plurality of image sensors, the sensor activation sequence defining an activation sequence for the plurality of image sensors.

Additionally or alternatively, in at least some embodiments of the example computer-implemented method, determining, based on the plurality of image sensors and the sensor activation sequence, the chosen image sensor of the plurality of image sensors for the image processing operation includes (a) setting a selected image sensor of the plurality of image sensors based on the sensor activation sequence; (b) activating the selected image sensor to capture an image data object; (c) processing the image data object to determine whether the selected image sensor should be the chosen image sensor for the image processing operation, wherein the chosen image sensor is set to the selected image sensor upon determining the selected image sensor should be the chosen image sensor for the image processing operation; and in a circumstance where the selected image sensor is determined not to be the chosen image sensor for the image processing operation, repeating operations (a), (b), and (c) for at least one other image sensor of the plurality of image sensors. Additionally or alternatively, in at least some such embodiments of the example computer-implemented method, processing the image data object to determine whether the selected image sensor should be the chosen image sensor for the image processing operation includes (d) processing the image data object to identify the selected image sensor is associated with a sensor focus distance closest to a predicted target focal distance for performing the image processing operation.

Additionally or alternatively, in at least some embodiments of the example computer-implemented method, the computer-implemented method further includes capturing a image data object using the chosen image sensor; and processing the image data object based on the image processing operation. Additionally or alternatively, in at least some such embodiments of the example computer-implemented method, the image data object comprises a first image data object, and the computer-implemented method further includes determining, based on the first image data object, the chosen image sensor should remain chosen for the image processing operation; capturing a second image data object using the chosen image sensor; and processing the second image data object based on the image processing operation. Additionally or alternatively, in at least some embodiments of the example computer-implemented method, the image data object comprises a first image data object, and the computer-implemented method further includes determining, based on the first image data object, the chosen image sensor should no longer be chosen for the image processing operation; reactivating the broadest illuminator source; determining, based on the plurality of image sensors and the sensor activation sequence, a new chosen image sensor of the plurality of image sensors for the image processing operation; and activating a new chosen illuminator source of the plurality of illuminator sources, the new chosen illuminator source associated with the new chosen image sensor.

Additionally or alternatively, in at least some embodiments of the example computer-implemented method, the broadest illuminator source is configured to illuminate at a predetermined illumination level based on the plurality of illuminator sources and/or the plurality of image sensors.

Additionally or alternatively, in at least some embodiments of the example computer-implemented method, the broadest illuminator source is associated with a first illumination pattern size and the chosen illuminator source are associated with different illumination pattern size, the first illumination pattern size different than the second illumination pattern size.

Additionally or alternatively, in at least some embodiments of the example computer-implemented method, each of the plurality of illuminator sources is paired with at least one of the plurality of image sensors.

In accordance with yet another aspect of the disclosure, an apparatus for flicker control in a multi-sensor environment is provided. The apparatus includes computing hardware, for example one or more processors configured based on computer-coded instructions, which may be stored on one or more associated non-transitory memory devices and/or otherwise accessible to the processor(s), to perform one or more operations for flicker control in the multi-sensor environment. For example, in at least one example embodiment of the apparatus, the apparatus is configured to activate a broadest illuminator source of a plurality of illuminator sources, wherein the broadest illuminator source produces a broadest illumination pattern having a greatest horizontal size of a plurality of illumination patterns projected via the plurality of illuminator sources. The example apparatus is further configured to determine, based on a plurality of image sensors and an sensor activation sequence, a chosen image sensor of the plurality of image sensors for an image processing operation. The example apparatus is further configured to activate a chosen illuminator source of the plurality of illuminator sources, the chosen illuminator source associated with the chosen image sensor.

Additionally or alternatively, in at least some embodiments of the example apparatus, the apparatus is further configured to initialize the sensor activation sequence associated with the plurality of image sensors, the sensor activation sequence defining an activation sequence for the plurality of image sensors.

Additionally or alternatively, in at least some embodiments of the example apparatus, to determine, based on the plurality of image sensors and the sensor activation sequence, the chosen image sensor of the plurality of image sensors for the image processing operation, the apparatus is configured to (a) set a selected image sensor of the plurality of image sensors based on the sensor activation sequence; (b) activate the selected image sensor to capture an image data object; (c) process the image data object to determine whether the selected image sensor should be the chosen image sensor for the image processing operation, wherein the chosen image sensor is set to the selected image sensor upon determining the selected image sensor should be the chosen image sensor for the image processing operation; and in a circumstance where the selected image sensor is determined not to be the chosen image sensor for the image processing operation, repeat operations (a), (b), and (c) for at least one other image sensor of the plurality of image sensors. Additionally or alternatively, in at least some such embodiments of the example apparatus, to process the image data object to determine whether the selected image sensor should be the chosen image sensor for the image processing operation, the apparatus is configured to (d) process the image data object to identify the selected image sensor is associated with a sensor focus distance closest to a predicted target focal distance for performing the image processing operation.

Additionally or alternatively, in at least some embodiments of the example apparatus, the apparatus is further configured to capture a image data object using the chosen image sensor; and process the image data object based on the image processing operation. Additionally or alternatively, in at least some such embodiments of the example apparatus, the image data object comprises a first image data object, and the apparatus is further configured to determine, based on the first image data object, the chosen image sensor should remain chosen for the image processing operation; capture a second image data object using the chosen image sensor; and process the second image data object based on the image processing operation. Additionally or alternatively, in at least some such embodiments of the example apparatus, the image data object comprises a first image data object, and the apparatus is further configured to determine, based on the first image data object, the chosen image sensor should no longer be chosen for the image processing operation; reactivate the broadest illuminator source; determine, based on the plurality of image sensors and the sensor activation sequence, a new chosen image sensor of the plurality of image sensors for the image processing operation; and activate a new chosen illuminator source of the plurality of illuminator sources, the new chosen illuminator source associated with the new chosen image sensor.

Additionally or alternatively, in at least some embodiments of the example apparatus, the broadest illuminator source is configured to illuminate at a predetermined illumination level based on the plurality of illuminator sources and/or the plurality of image sensors.

Additionally or alternatively, in at least some embodiments of the example apparatus, the broadest illuminator source is associated with a first illumination pattern size and the chosen illuminator source are associated with different illumination pattern size, the first illumination pattern size different than the second illumination pattern size.

Additionally or alternatively, in at least some embodiments of the example apparatus, each of the plurality of illuminator sources is paired with at least one of the plurality of image sensors.

In accordance with yet another aspect of the present disclosure, a second computer-implemented method for flicker control in a multi-sensor environment is provided. The second computer-implemented method may be performed via a processor, and/or supporting hardware, and/or various computing hardware implementations as described below. In at least one example embodiment, the second computer-implemented method includes activating, of a broadest illuminator source and at least a second illuminator source, the broadest illuminator source, wherein the broadest illuminator source is associated with a first image sensor and the second illuminator source is associated with a second image sensor. The second computer-implemented method further includes capturing, using at least one of the first image sensor and the second image sensor, a first image data object set for processing associated with an image processing operation. The second computer-implemented method further includes determining the second illuminator source should be activated based on one or more activation determinations. The second computer-implemented method further includes deactivating the broadest illuminator source. The second computer-implemented method further includes activating the second illuminator source. The second computer-implemented method further includes capturing, using at least one of the first image sensor and the second image sensor, a second image data object set for processing associated with the image processing operation.

Additionally or alternatively, in at least some embodiments of the second example computer-implemented method, determining the second illuminator source should be activated based on the one or more activation determinations includes determining activation time data associated for the broadest illuminator source satisfies an illuminator source change time threshold.

Additionally or alternatively, in at least some embodiments of the second example computer-implemented method, determining the second illuminator source should be activated based on the one or more activation determinations includes determining a number of captured frames associated with the captured first image data object set satisfies an illuminator source change capture threshold.

Additionally or alternatively, in at least some embodiments of the second example computer-implemented method, the first image data object set comprises a most-recent image data object, and determining the second illuminator source should be activated based on the one or more activation determinations includes processing the most-recent image data object to identify a property value for an image data property associated with the most-recent image data object; and determining the property value satisfies an illuminator source change image property value threshold. Additionally or alternatively, in at least some such embodiments of the second example computer-implemented method, the image data property comprises an image white level associated with the most-recent image data object.

Additionally or alternatively, in at least some embodiments of the second example computer-implemented method, the second example computer-implemented method further includes determining the broadest illuminator source should be reactivated based on an activation determination set; deactivating the second illuminator source; reactivating the broadest illuminator source; and capturing, using at least one of the first image sensor and the second image sensor, a third image data object set for processing associated with the image processing operation.

Additionally or alternatively, in at least some embodiments of the second example computer-implemented method, capturing, using at least one of the first image sensor and the second image sensor, the first image data object set includes capturing a first image data object subset of the first image data object set using the first image sensor and a second image data object subset of the of the first image data object set using the second image sensor, the first image data object subset and the second image data object subset captured by alternating between the first image sensor and the second image sensor.

Additionally or alternatively, in at least some embodiments of the second example computer-implemented method, the first image sensor and the second image sensor are associated with a plurality of image sensors comprising at least the first image sensor and the second image sensor.

Additionally or alternatively, in at least some embodiments of the second example computer-implemented method, the broadest illuminator source and the second illuminator source are associated with a plurality of illuminator sources, the plurality of illuminator sources comprising at least the broadest illuminator source and the second illuminator source.

In accordance with yet another aspect of the disclosure, a second example apparatus for flicker control in a multi-sensor environment is provided. The second example apparatus includes computing hardware, for example one or more processors configured based on computer-coded instructions, which may be stored on one or more associated non-transitory memory devices and/or otherwise accessible to the processor(s), to perform one or more operations for flicker control in the multi-sensor environment. For example, in at least one example embodiment of the second example apparatus, the second example apparatus is configured to activate, of a broadest illuminator source and at least a second illuminator source, the broadest illuminator source, wherein the broadest illuminator source is associated with a first image sensor and the second illuminator source is associated with a second image sensor. The second example apparatus is further configured to capture, using at least one of the first image sensor and the second image sensor, a first image data object set for processing associated with an image processing operation. The second example apparatus is further configured to determine the second illuminator source should be activated based on one or more activation determinations. The second example apparatus is further configured to deactivate the broadest illuminator source. The second example apparatus is further configured to activate the second illuminator source. The second example apparatus is further configured to capture, using at least one of the first image sensor and the second image sensor, a second image data object set for processing associated with the image processing operation.

Additionally or alternatively, in at least some embodiments of the second example apparatus, to determine the second illuminator source should be activated based on the one or more activation determinations, the second example apparatus is configured to determine activation time data associated for the broadest illuminator source satisfies an illuminator source change time threshold.

Additionally or alternatively, in at least some embodiments of the second example apparatus, to determine the second illuminator source should be activated based on the one or more activation determinations, the second example apparatus is configured to determine a number of captured frames associated with the captured first image data object set satisfies an illuminator source change capture threshold.

Additionally or alternatively, in at least some embodiments of the second example apparatus, the first image data object set comprises a most-recent image data object, and, to determine the second illuminator source should be activated based on the one or more activation determinations, the second example apparatus is configured to process the most-recent image data object to identify a property value for an image data property associated with the most-recent image data object; and determine the property value satisfies an illuminator source change image property value threshold. Additionally or alternatively, in at least some such embodiments of the second example apparatus, the image data property comprises an image white level associated with the most-recent image data object. Additionally or alternatively, in at least some embodiments of the second example apparatus, the second example apparatus is further configured to determine the broadest illuminator source should be reactivated based on an activation determination set; deactivate the second illuminator source; reactivate the broadest illuminator source; and capture, using at least one of the first image sensor and the second image sensor, a third image data object set for processing associated with the image processing operation.

Additionally or alternatively, in at least some embodiments of the second example apparatus, to capture, using at least one of the first image sensor and the second image sensor, the first image data object set, the second example apparatus if configured to capture a first image data object subset of the first image data object set using the first image sensor and a second image data object subset of the of the first image data object set using the second image sensor, the first image data object subset and the second image data object subset captured by alternating between the first image sensor and the second image sensor.

Additionally or alternatively, in at least some embodiments of the second example apparatus, the first image sensor and the second image sensor are associated with a plurality of image sensors comprising at least the first image sensor and the second image sensor.

Additionally or alternatively, in at least some embodiments of the second example apparatus, the broadest illuminator source and the second illuminator source are associated with a plurality of illuminator sources, the plurality of illuminator sources comprising at least the broadest illuminator source and the second illuminator source.

BRIEF DESCRIPTION OF THE DRAWINGS

Figure 1:
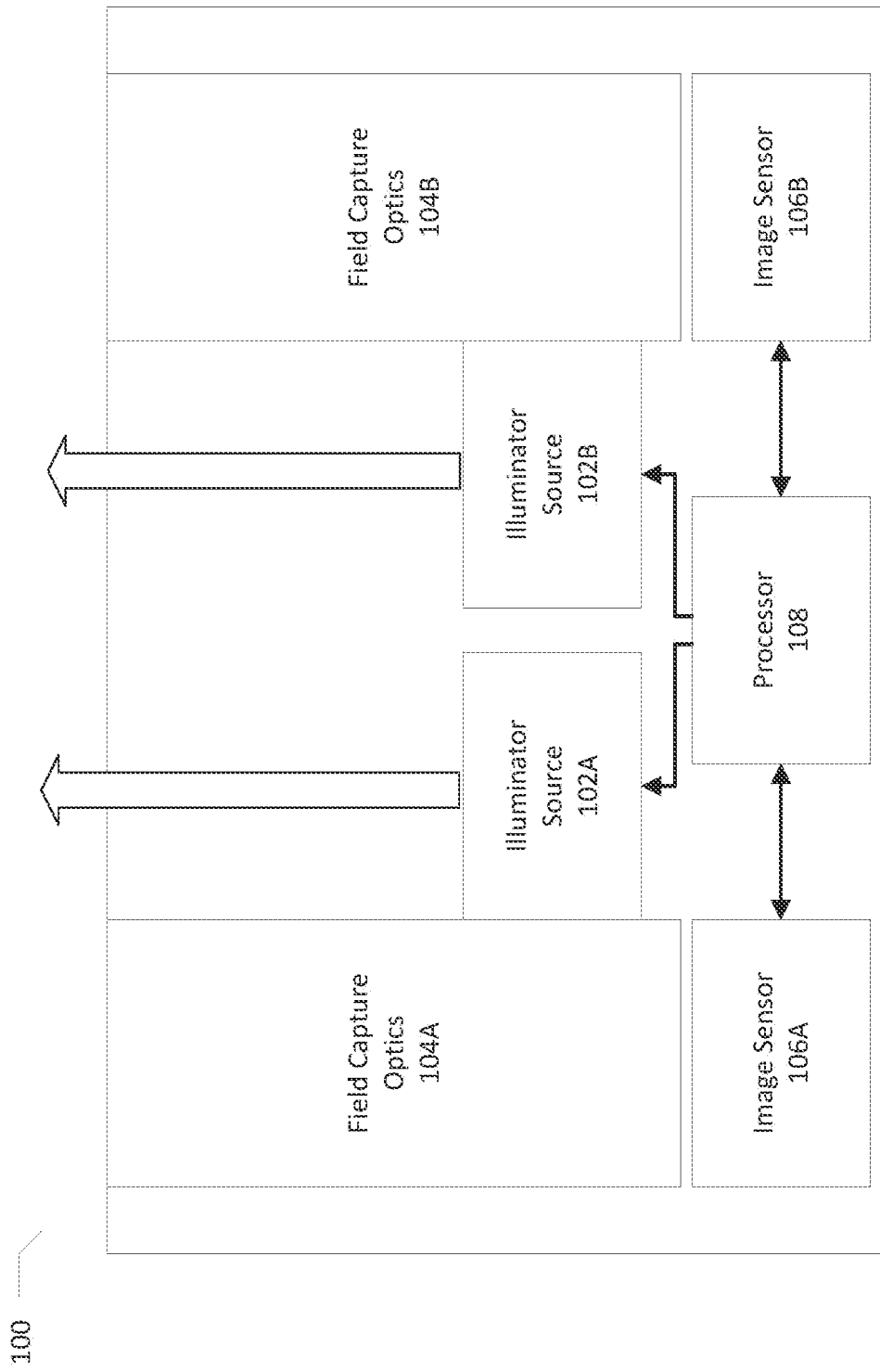
Figure 2:
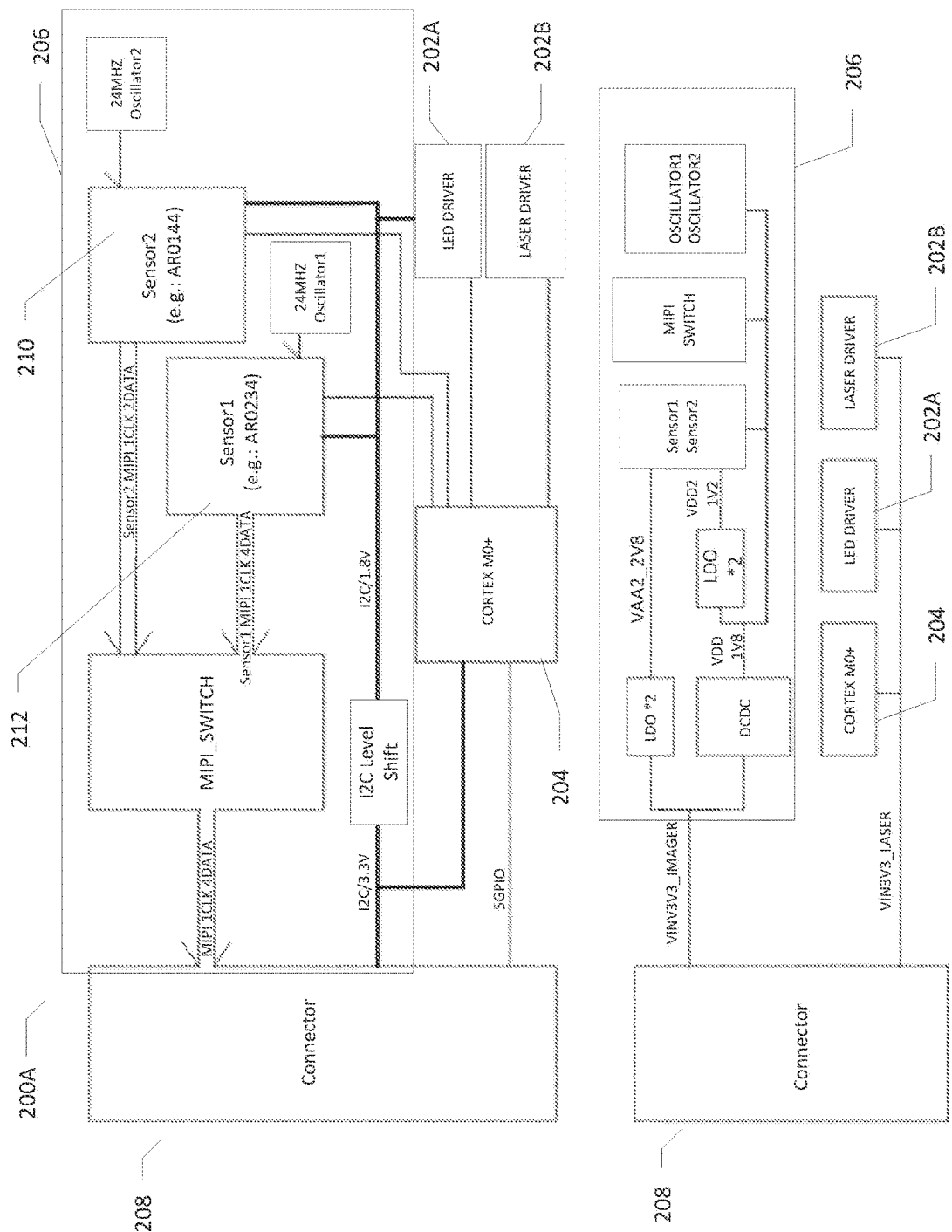
Figure 3:
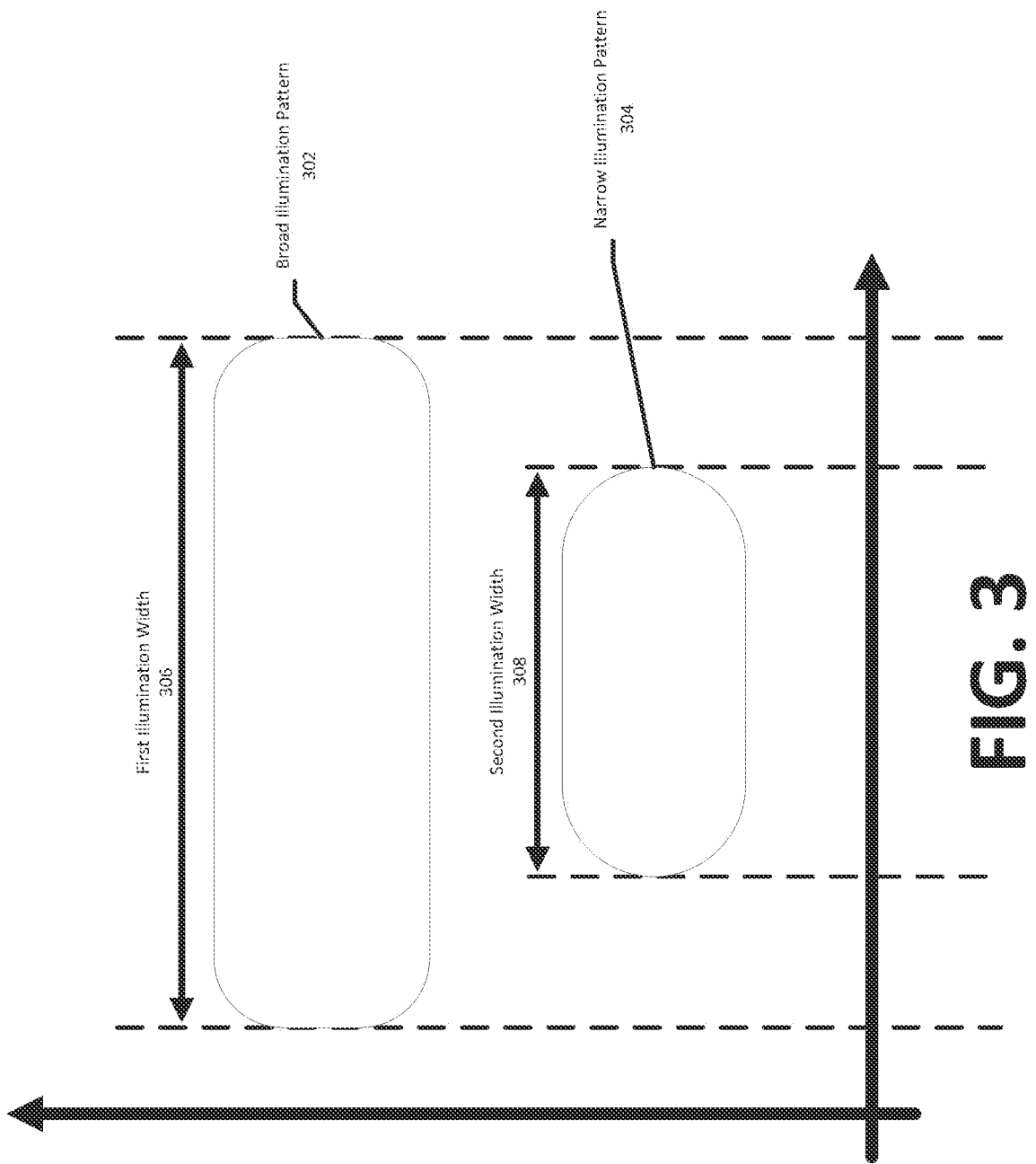
Figure 4:
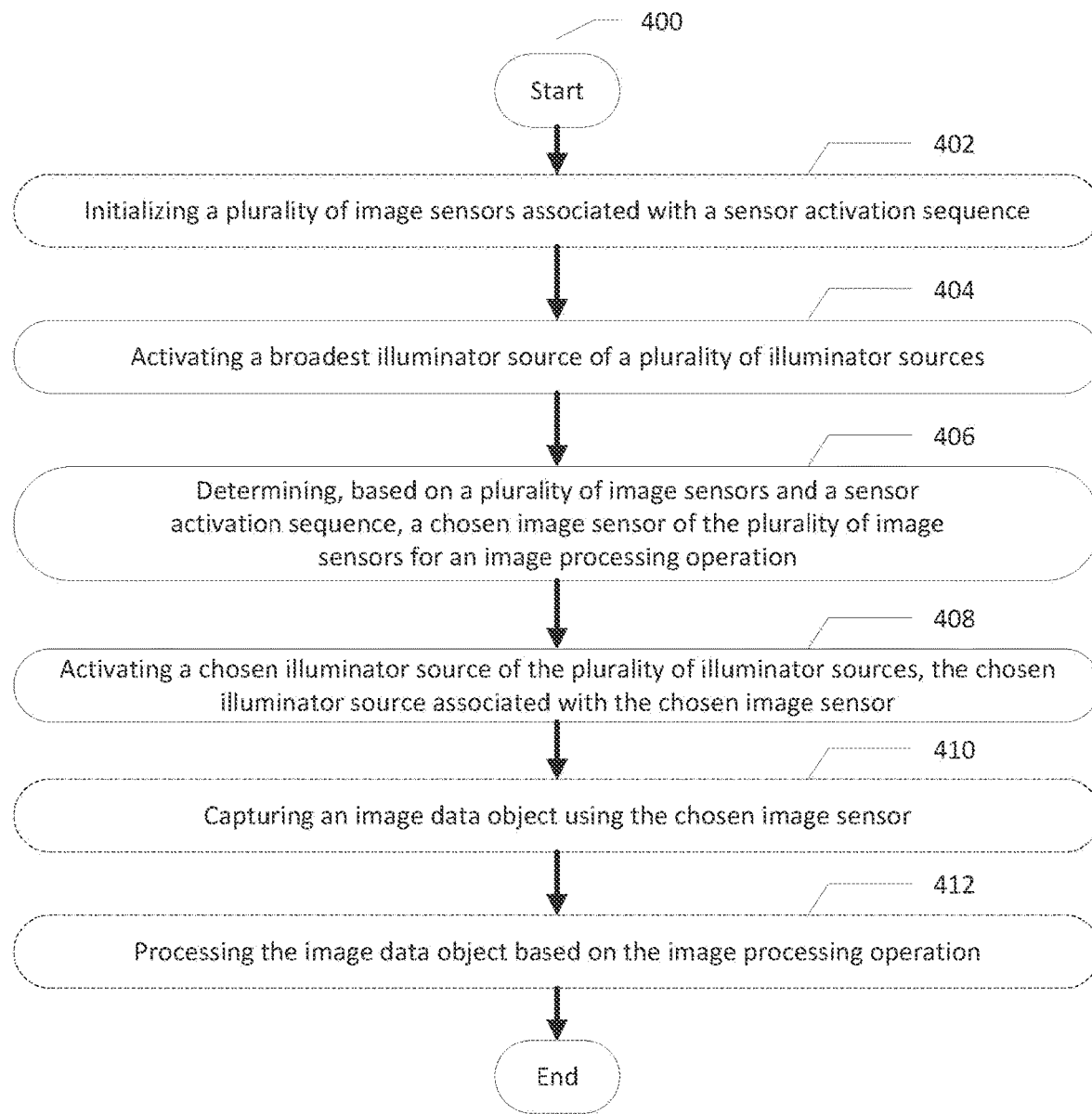
Figure 5:
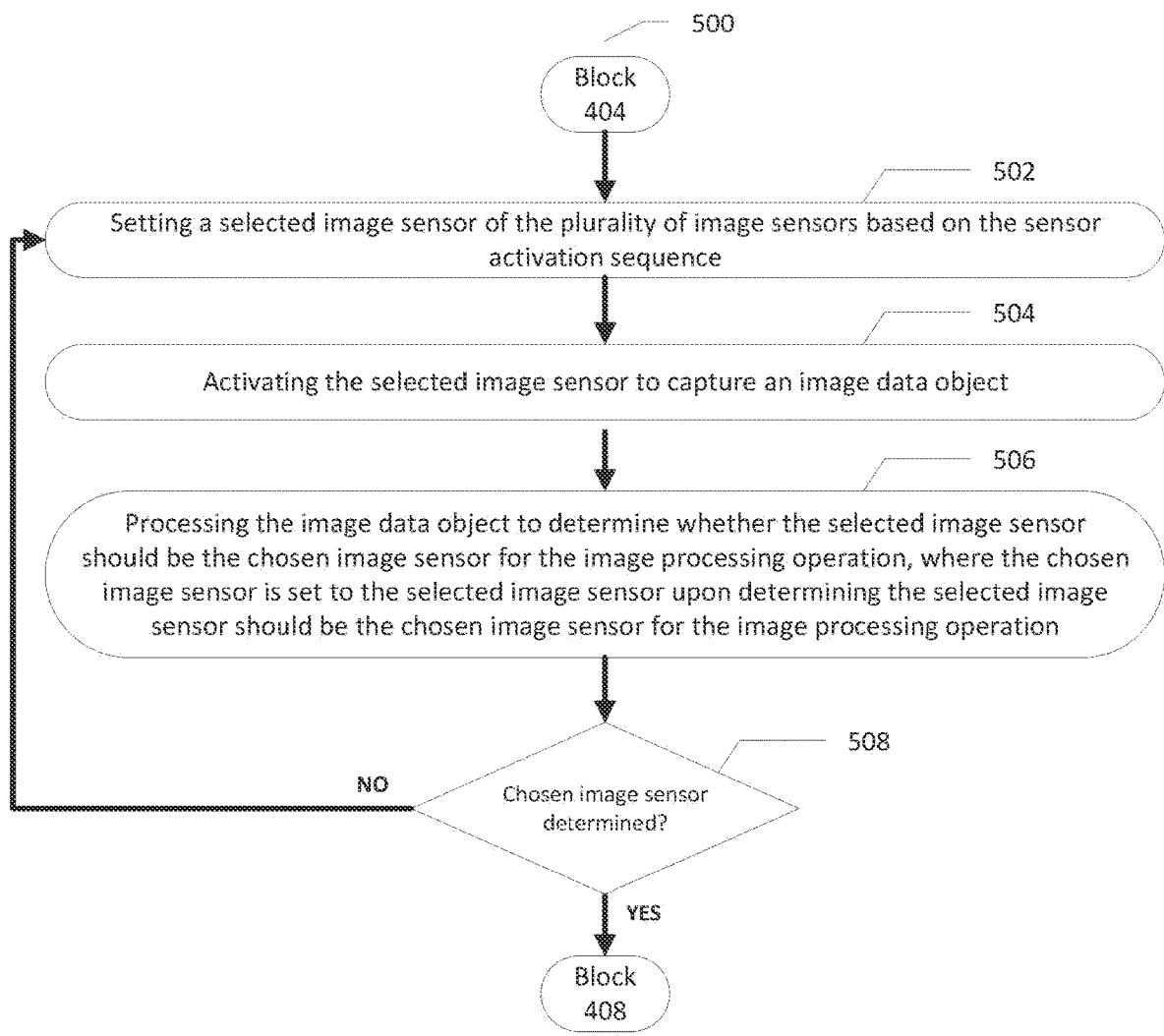
Figure 6:
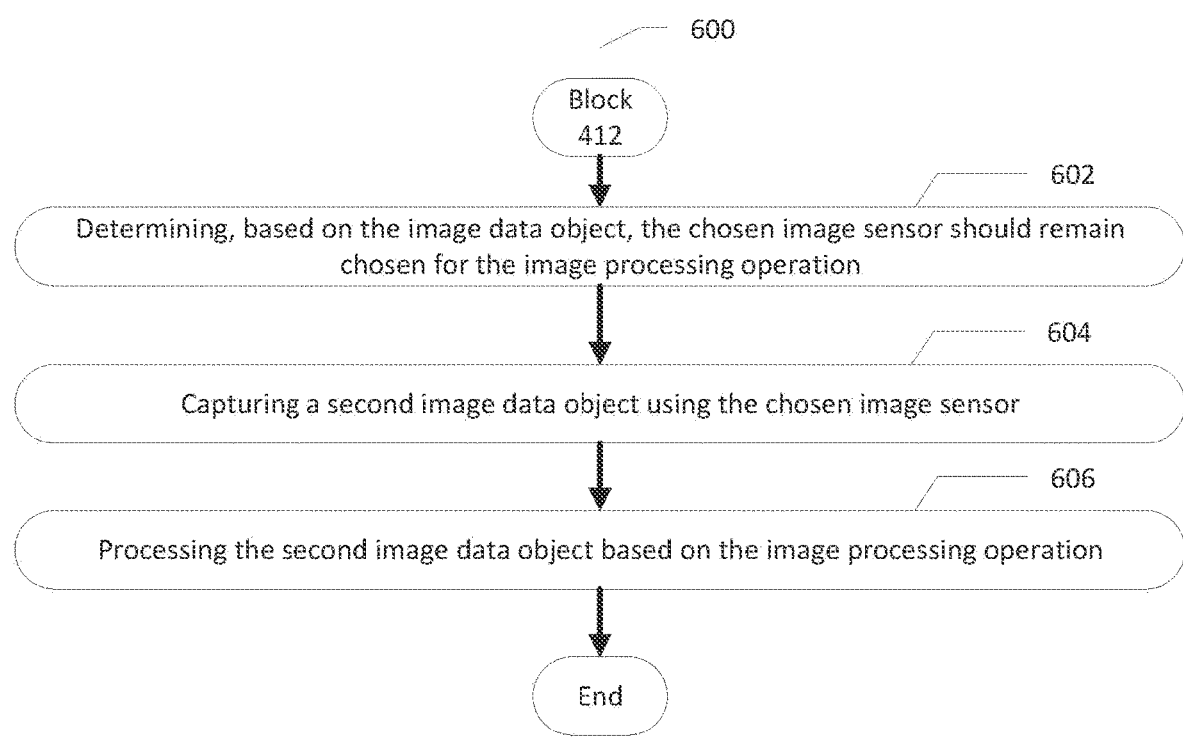
Figure 7:
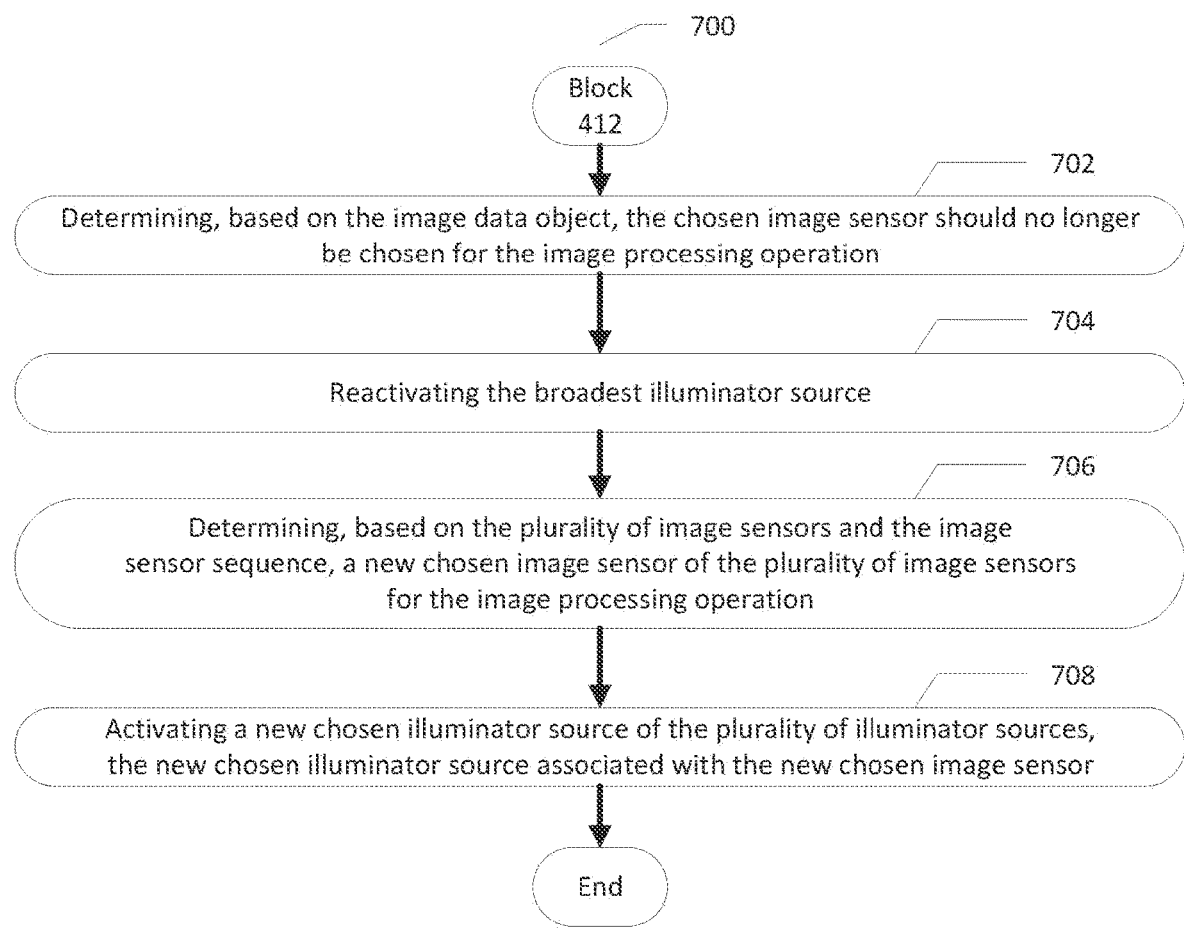
Figure 8:
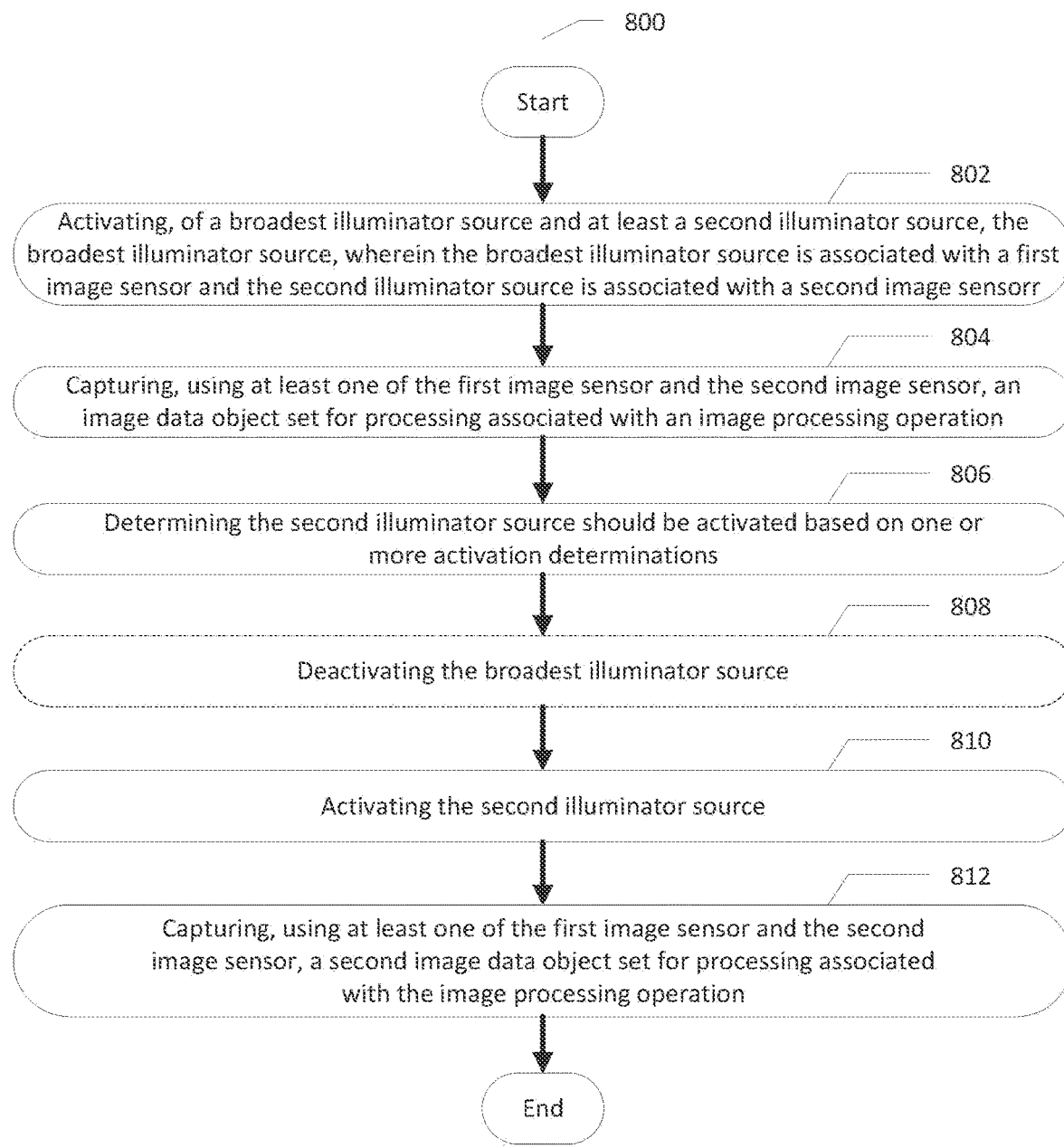
Figure 9:
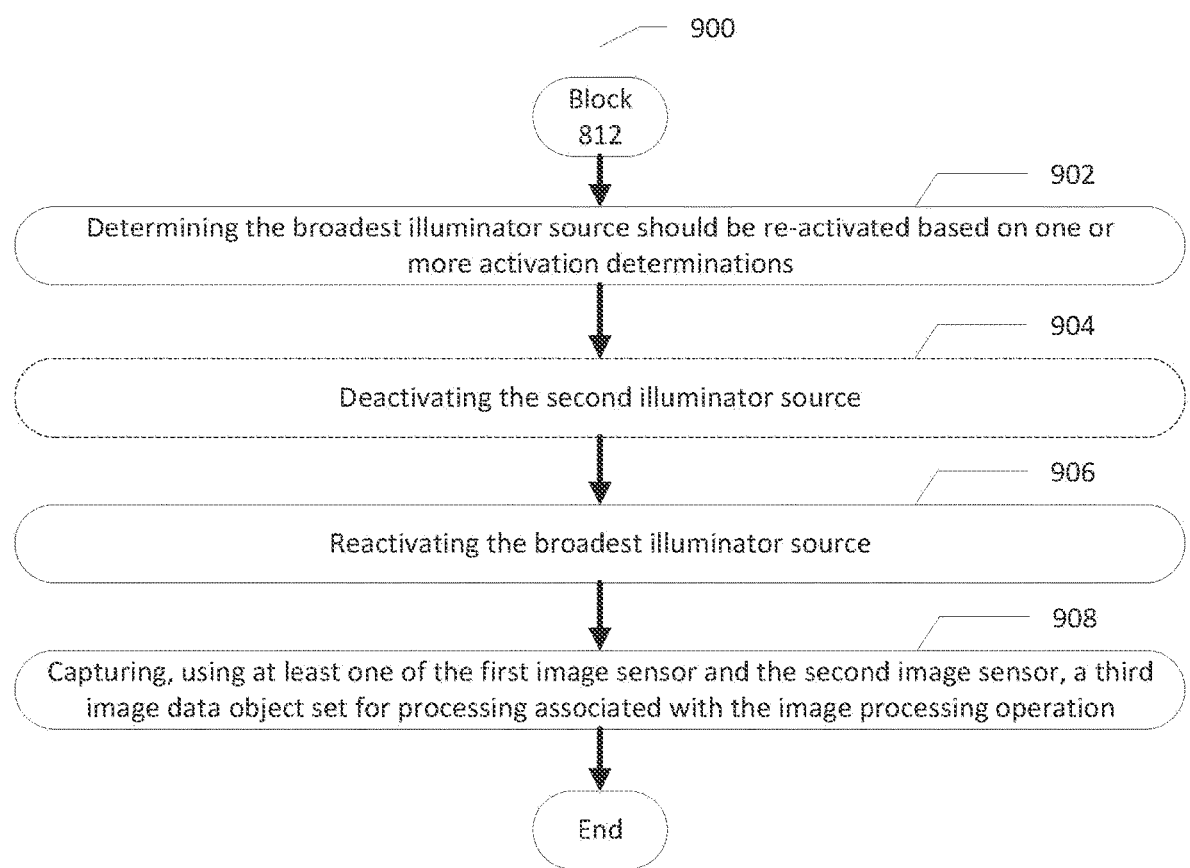
Figure 10:
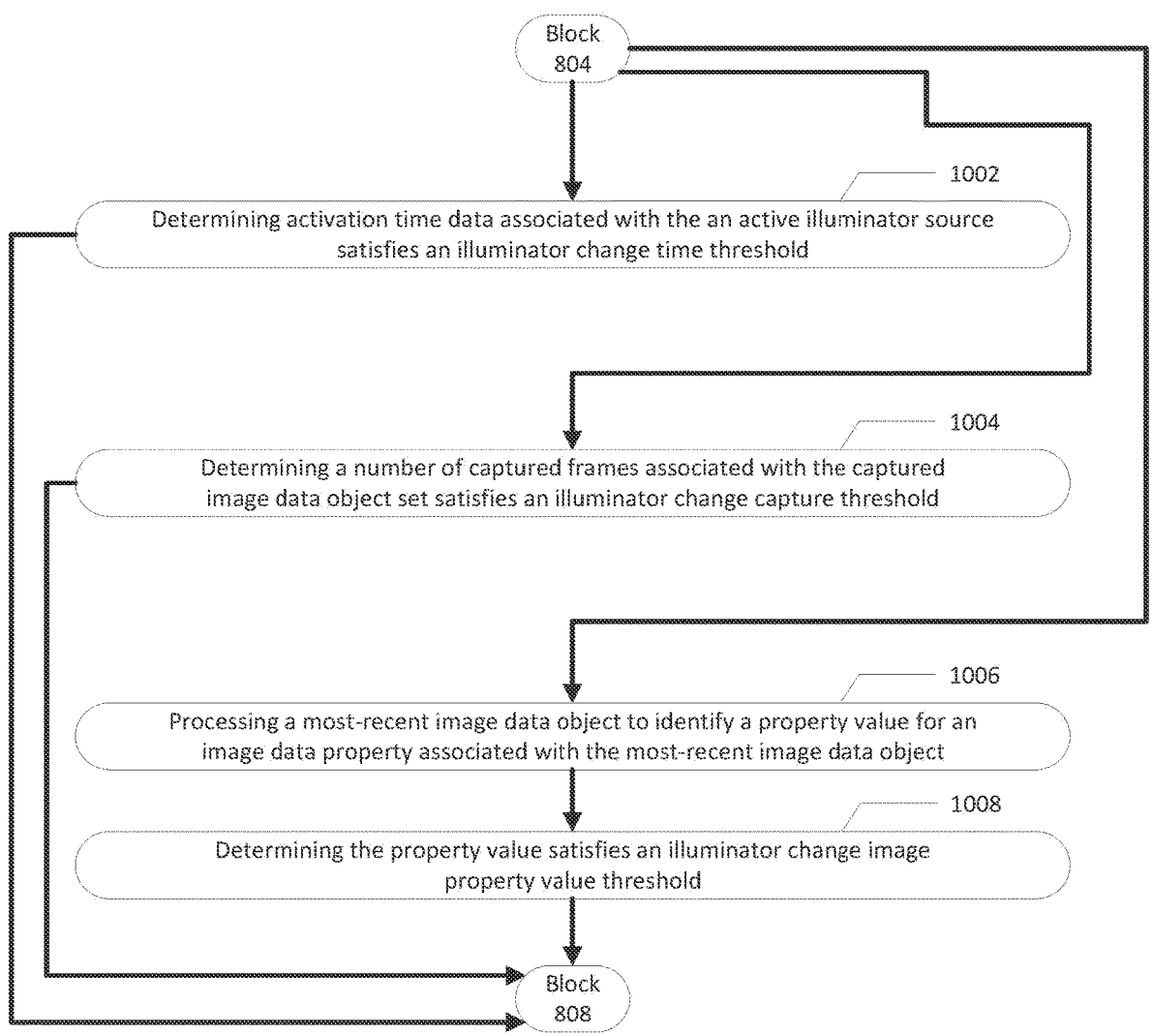

Having thus described the embodiments of the disclosure in general terms, reference now will be made to the accompanying drawings, which are not necessarily drawn to scale, and wherein:

FIG. 1 illustrates an example block diagram of an example apparatus in accordance with at least one example embodiment of the present disclosure;

FIG. 2 illustrates an example schematic block diagram including various computing hardware of example apparatuses, in accordance with at least some example embodiments of the present disclosure;

FIG. 3 illustrates an example visualization of example illumination projections having different projection pattern sizes, in accordance with example embodiments of the present disclosure;

FIG. 4 illustrates an example flowchart including example operations for flicker control in a multi-sensor environment, in accordance with at least some example embodiments of the present disclosure;

FIG. 5 illustrates an example flowchart including additional example operations for flicker control in a multi-sensor environment, specifically for determining, based on a plurality of image sensors and a sensor activation sequence, a chosen image sensor of the plurality of image sensors for an image processing operation, in accordance with at least some example embodiments of the present disclosure;

FIG. 6 illustrates an example flowchart including additional example operations for flicker control in a multi-sensor environment, specifically for continuing an image processing operation based on a chosen image sensor, in accordance with at least some example embodiments of the present disclosure;

FIG. 7 illustrates an example flowchart including additional example operations for flicker control in a multi-sensor environment, specifically for continuing an image processing operation based on a new chosen image sensor, in accordance with at least some example embodiments of the present disclosure;

FIG. 8 illustrates yet another example flowchart including alternative example operations for flicker control in a multi-sensor environment, in accordance with at least some alternative example embodiments of the present disclosure;

FIG. 9 illustrates an example flowchart including additional example operations for flicker control in a multi-sensor environment, specifically for reactivating a broadest illuminator source for utilization in capturing one or more image data objects, in accordance with at least some example embodiments of the present disclosure; and FIG. 10 illustrates an example flowchart including additional example operations for flicker control in a multi-sensor environment, specifically for determining an illuminator source (e.g., a broadest illuminator source or a second illuminator source) should be activated based on one or more activation determinations, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure address the various computing, cost, and implementation inefficiencies and problems associated with flicker control in a multi-sensor environment. Particular, at least some example embodiments of the present disclosure utilize specific implementations embodied in hardware, software, firmware, and/or a combination thereof, that control flicker in such multi-sensor environments. Particularly, example embodiments described herein provide flicker control to minimize the effects of such flicker on human observers, such as by reducing the flicker to a desired extent and/or as much as possible, Additionally or alternatively, at least some example embodiments described herein control flicker without wasting illumination energy by utilizing a single, significantly brighter illuminator source. Additionally or alternatively, at least some example embodiments described herein control flicker without requiring faster, specialized image sensors that may cycle outside the human-perceptible range, but are often more expensive thus making such implementations cost prohibitive for widescale production.

Example embodiments herein utilize a plurality of illuminator sources each associated with an image sensor of a plurality of image sensors. In some example embodiments, flicker is controlled by using a broadest illuminator source of a plurality of illuminator sources while determining a chosen image sensor for use associated with an image processing operation. In this regard, the broadest illuminator source may provide illumination as one or more sensors are tested to determine which image sensor should be chosen for use in capturing image data objects for processing, for example based on which image sensor is most likely to capture image data objects that will enable successful completion of the image processing operation or a particular stage thereof. In this regard, the broadest illuminator source of the plurality of illuminator sources is utilized in a process for determining and choosing an image sensor for utilizing to perform a particular image processing operation and choosing that image sensor for use in subsequent actions (e.g., capturing image data objects and processing said captured image data objects). Once a chosen image sensor is determined and chosen, the corresponding illuminator source associated with the chosen image sensor (e.g., the "chosen illuminator source") is activated for the duration of the time the chosen image sensor is in use. Once it is determined the chosen image sensor should no longer be chosen, for example because the chosen image sensor is determined to perform slower and/or is less likely to capture sufficient image data objects than another image sensor for processing according to an ongoing image processing operation, the chosen illuminator source may be deactivated and/or the broadest illuminator source may be reactivated for use in a subsequent cycle of identifying a new chosen image sensor. In this regard, flicker caused by the plurality of illuminator sources is reduced, as the broadest illuminator source is utilized while determining the chosen image sensor, and each other illuminator source is not activated unless and/or until it is determined that the associated image sensor is determined to be chosen for use. In this regard, such embodiments reduce the number of activations, and corresponding flicker, for the plurality of illuminator sources through reliance on the broadest illuminator source of the plurality of illuminator sources. Further, in at least some embodiments, the chosen illuminator source may remain active until it is determined the chosen illuminator source is no longer be chosen, thereby further reducing the flicker caused by constant activation of various illuminator sources.

In some other example embodiments, a broadest illuminator source of the plurality of illuminator sources is utilized to otherwise minimize the number of changes in activation between the broadest illuminator source and one or more other illuminator source(s) of the plurality of illuminator sources. In this regard, in at least some example embodiments, the reduced number of activations better controls flicker while sensor activation may remain split between the plurality of image sensors. For example, in a dual-sensor/dual-illuminator environment, instead of alternating the active illuminator source on each image frame, the image sensor used to capture an image data object may be alternated without affecting the illumination. In some such embodiments, the illuminator source may be changed based on one or more activation determinations, for example an activated length of time, a number of captured data objects, and/or one or more determined image data property values associated with image data objects captured by such image sensors. Such embodiments reduce the number of activations for each illuminator source, thus reducing flicker associated with the plurality of illuminator sources. Some such implementations may be designed utilizing conventional image sensor and/or illuminator source computing hardware. As such, component cost remains the same while still providing at least the identified advantages.

In this regard, in at least some embodiments, each image source may be associated with any number of illuminator sources. For example, in some embodiments, each image sensor is associated with a single associated illuminator source, such that when the image sensor is set as the chosen image sensor, the corresponding single illuminator source is also set and activated as the chosen illuminator source. In other embodiments, an image sensor is associated with an illuminator source set including two or more illuminator sources, such that the chosen illuminator source embodies the illuminator source set. Additionally or alternatively, in some embodiments, a subset of the image sensors are associated with a single illuminator source, and a second subset of the image sensors are associated with one or more various illuminator source sets. In this regard, the activations of various illuminator sources may be customized based on desired illumination levels, flicker levels, costs, power consumption, and/or one or more other parameters Definitions As used herein, the terms "data object," "data," "content" "information," and similar terms may be used interchangeably to refer to data capable of being transmitted, received, and/or stored in accordance with embodiments of the present disclosure. Additionally, data objects may refer to values captured, generated, or derived by embodiments described herein. Thus, use of any such terms should not be taken to limit the spirit and scope of embodiments of the present disclosure.

The term "processor" refers to computing hardware, firmware, and/or software for performing one or more instructions representing computer-implemented actions. In some embodiments, a processor includes one or more memory components for storing instructions and/or data objects for manipulation. Additionally or alternatively, in some embodiments, a processor is configured to communicate with one or more memory devices for retrieving instructions and/or storing and retrieving data objects for manipulation. Non-limiting examples of processors include specially configured processing circuitry, a microprocessor, a central processing unit ("CPU"), a digital signal processor ("DSP"), and/or a combination thereof. The term "controller" refers to a specialized processor for communicating with, and/or transmitting one or more signals for controlling, one or more components, devices, and/or other computing hardware.

The term "image sensor" refers to computing hardware for capturing image data embodied by an image data object. An exemplary image sensor converts light and/or other electromagnetic energy reflected off of a target and/or field, and provides an output signal representative thereof. In some such embodiments, the output signal is embodied by the image data object outputted by the image sensor. Image sensors may be an array of pixels adapted to operate in a global shutter, or full frame shutter, mode or alternatively operate in a rolling shutter mode. In some embodiments, an image sensor is a color or monochrome 2D solid state image sensor implemented in any of CCD, CMOS, NMOS, PMOS, CID, CMD, and/or back-illuminated technologies. In some embodiments, the image sensor may be either a progressive or interleaved imager. In at least some embodiments, the image sensor may contain an array of light sensitive photodiodes (or pixels) that convert incident light energy into electric charge. Many solid state image sensors also allow regions of a full frame of image data to be addressed. An exemplary image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning.

An image sensor is configured for capturing image data based on a particular image size, for example represented by the pixel count associated with the image sensor. Additionally, in some embodiments, the term "image sensor" additionally refers to supporting circuitry/hardware, firmware, and/or software for configuring the data captured and/or output by the image sensor. For example, the term "image sensor" may additionally refer to supporting circuitry for generating a middle frame image data object from a captured full frame image data object, and/or subsequently outputting the middle frame image data object. Non-limiting examples of image sensors include a global shutter monochrome sensor (1920×1200 resolution, 3 um pixel) and a global shutter monochrome sensor (1280×800 resolution, 3 um pixel).

The term "image processing operation" refers to one or more actions defining an algorithm for identifying data, generating data, decoding data, or otherwise identifying data representing a desired result based on processing of one or more image data objects captured via one or a plurality of image sensors. In some embodiments, an image processing operation includes one or more "image processing operation stages" or "stages," which refers to sub-steps for completing a corresponding image processing operation. Non-limiting examples of an image processing operation include decoding machine readable provided within the target or captured image data object(s), dimensioning an object within the target or captured image data object(s), and identifying features of a captured image data object.

The term "activation time data" refers to electronically managed data representing a length of time that a component has been active. In some embodiments, activation time data is maintained in any of myriad of known time units (e.g., milliseconds, seconds, nanoseconds, and the like). For example, in some embodiments, activation time data associated with an illuminator source refers to data representing the length of time that the illuminator source has been producing light.

The term "illuminator change time threshold" refers to electronically managed data representing a threshold length of time that indicates when an active illuminator source is to be changed. For example, in some embodiments, a currently active illuminator source is deactivated upon the activation time data for the currently active illuminator source satisfying a corresponding illuminator change time threshold, for example by exceeding the threshold. In some embodiments, each illuminator source is associated with an illuminator change time threshold, such that the illuminator change time threshold may be for each illuminator source individually.

The term "number of captured frames" refers to electronically managed data representing a count of image data objects captured by a particular image sensor, or by a plurality of image sensors, while a particular illuminator source is active. In some embodiments, a processor and/or other computing hardware is configured to increment and/or otherwise track a number of captured frames for an active illuminator source, for example such that the number of captured frames associated with an active illuminator source is incremented when any of a plurality of image sensors captures an image data object while the illuminator source remains active.

The term "illuminator change capture threshold" refers to electronically managed data representing a threshold number of image data objects indicating when an active illumination source is to be changed. For example, in some embodiments, a currently active illuminator source is deactivated upon the number of captured frames for the currently active illuminator source satisfying a corresponding illuminator change capture threshold, for example by exceeding the threshold. In some embodiments, each illuminator source is associated with an illuminator change capture threshold, such that the illuminator change capture threshold may be identified for each illuminator source individually.

The term "broad" refers to a angle of a projected illumination pattern along and/or a measurement in one or more directions within a particular field based on a particular illumination angle. In this regard, the term "broadest" refers to a broadest illumination angle and/or a corresponding maximal measurement of a plurality of projected illumination patterns in one or more directions (e.g., horizontally, vertically, or in any other direction). Further, the term "broadest illuminator source" refers to a particular illuminator source of a plurality of illuminator sources that associated with a broadest illumination angle in at least one direction the plurality of illuminator sources.

The term "chosen image sensor" refers to an image sensor of a plurality of image sensors determined by computing hardware, such as one or more processors and/or controllers, for use in capturing image data objects for processing associated with an image processing operation. In some embodiments, a chosen image sensor is determined, based on one or more determination and/or processing algorithms, to be best, most efficient, most likely to perform successfully, or the like, for performing at least one iteration of the image processing operation and/or a current stage thereof. The chosen image sensor of a plurality of image sensors may be chosen based on processing a captured image data object from the image sensor and performing one or more determinations. For example, in some embodiments the chosen image sensor is determined to capture and/or likely capture image data objects that are determined to most likely be successfully processed by one or more components, for example by a processor or other computing hardware, such that the image sensor is chosen as the chosen image sensor. Alternatively or additionally, in some embodiments, the processor and/or other computing hardware determines based on an attempt to decode a barcode or other symbology data within an image data object captured by a sensor that the image data object will likely decode without error, such that the image sensor is chosen as the chosen image sensor. Additionally or alternatively, the processor and/or other computing hardware determines the chosen image sensor has the least logged image processing errors and/or failures of the plurality of image sensors, such that the image sensor is chosen as the chosen image sensor. Additionally or alternatively, in some embodiments, the processor and/or other computing hardware identifies an ambient light level for each image data object captured via a plurality of image sensors and determines the image sensor is associated with the lowest level of detected ambient light, such that the image sensor is chosen as the chose image sensor. Additionally or alternatively, in some embodiments the processor and/or other computing hardware is configured to determine a processing speed for each image data object captured via a plurality of image sensors and determines the image sensor is associated with the fastest image processing speed, such that the image sensor is chosen as the chosen image sensor.

System Architecture and Example Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

FIG. 1 illustrates an example block diagram of an example apparatus in accordance with at least one example embodiment of the present disclosure. Specifically, FIG. 1 illustrates an example multi-sensor, multi-illuminator source imaging apparatus 100 that may be specially configured for minimizing flicker as described herein. The apparatus 100 includes a myriad of components, including the field capture optics 104A and 104B (collectively "field capture optics 104"), the illuminator sources 102A and 102B (collectively "illuminator sources 102"), the image sensors 106A and 106B (collectively "image sensors 106"), and processor 108. It should be appreciated that, in other embodiments, the apparatus 100 may include any number of image sensors and/or illuminator sources (e.g., a tri-sensor and/or tri-illuminator source apparatus, a quad-sensor and/or quad-illuminator source apparatus, and/or the like). In yet other embodiments, the apparatus 100 includes any number of image sensors and/or illuminator sources, to include a single image sensor with a single illuminator source.

Each of the illuminator sources 102 may be embodied by any of a number of light generation components. In some embodiments, the illuminator source 102A is embodied by one or more light emitting diodes ("LED"), laser emitting diodes, and/or the like. Additionally or alternatively, in some embodiments, the illuminator sources 102B is similarly embodied by any number of light generation components. For example, in some embodiments, the illuminator source 102B is embodied by one or more LEDs, laser emitting diodes, and/or the like. In some embodiments, each of the illuminator sources 102 is associated with pattern projection optics for producing a particular illumination pattern based on the produced light. In this regard, the pattern projection optics associated with the illuminator source 102A may be configured to produce a first illumination projection having a first illumination pattern, and the pattern projection optics associated with the illuminator source 102B may be configured to produce a second illumination projection having a second illumination pattern. It should be appreciated that one or more parameters of the illuminator sources 102 (e.g., intensity, aperture, or the like) as well as one or more parameters of corresponding pattern projection optics (e.g., a lens angle or other design, lens material, or the like) may influence the illumination projection produced by each of the illuminator source 102. In this regard, one of the illuminator sources 102 may produce an illumination pattern that covers a broader field, in at least one direction, than the other illuminator source. The illuminator source that projects the broadest illumination pattern may be referred to as the broadest illuminator source.

Each of the illuminator sources 102 may be associated with a corresponding image sensor and corresponding field capture optics. In some embodiments, the illuminator source 102A is associated with the field capture optics 104A and image sensor 106A located nearest the illuminator source 102A. In other embodiments, the illuminator source 102A is associated with the field capture optics 104B and image sensor 106B located further from the corresponding illumination source. As illustrated, for example, the illuminator source 102A may be associated with the field capture optics 104B and image sensor 106B in a circumstance where the illuminator source 102A is a near-field illuminator source that may cause light reflection that affects operation of the image sensor 106B if positioned adjacent.

Each illuminator source of the illuminator sources 102 is configured to produce light at a particular illumination level. In some embodiments, the illumination level for each illuminator source is predetermined. In other embodiments, one or more illuminator source is configured to produce a variable illumination level, for example based on a received activation signal from one or more other components (e.g., the processor 106 and/or associated supporting hardware). In some embodiments, the illumination level for each illuminator source may be determined and/or predetermined based on a myriad of factors. For example, in some embodiments, the illumination levels for the various illuminator sources are determined based on the configurations of the included image sensors and/or corresponding field capture optics, such as imaging lenses. In this regard, illuminator sources may be included that enable desired functionality associated with the image sensors without overexposing the field for capture to a particular light level. Additionally or alternatively, in some embodiments, the illuminator sources included may be particularly selected to enable combinations of illuminator sources to be activated to achieve a desired illumination level based on the combination of active illuminator sources.

The field capture optics 104 may each include one or more lenses, and/or subassemblies thereof, configured to enable the corresponding image sensors 106 to capture a particular field of view. In this regard, each of the field capture optics 104 may each be associated with a different focal length, field of view, and/or the like. Additionally or alternatively, each of the field capture optics 104 may be embodied by a different lens configuration and/or optical subassembly. For example, in some embodiments, the field capture optics 104A is embodied by a 3-glass optical lens and the field capture optics 104B is embodied by a 3-plastic optical lens. It should be appreciated that the field capture optics 104 may each be configured based on various requirements for the apparatus (e.g., thermal resistance, cost factors, and/or the like).

The field capture optics 104A are configured to enable light to enter and flow through the optics for capturing by the image sensor 106A. Similarly, the field capture optics 104B are configured to enable light to enter and flow through the optics for capturing by the image sensor 106B. In this regard, the light captured by the image sensor 106B may be based on the illumination patterns projected into the field by the illuminator sources 102. Particularly, for example, the illuminator source 102B may be configured to produce a first illumination pattern for capture by the image sensor 106A via the field capture optics 104A. Additionally or alternatively, for example, the illuminator source 102A may be configured to produce a second illumination pattern for capture by the image sensor 106B via the field capture optics 104B. It should be appreciated that each of the image sensors 106 may be embodied by computing hardware configured to capture such image data, for example utilizing, without limitation, charge-coupled devices ("CCD") and/or complementary metal oxide semiconductor ("CMOS"). sensor devices, equivalents thereof, or any combination thereof.

In some embodiments, the illuminator source 102A and/or illuminator source 102B are specifically configured based on the image sensors 106. For example, in some embodiments, the illuminator source 102B is a broadest illuminator source configured for illuminating a particular field (e.g., a broad field). In this regard, the illuminator source 102B may be configured for producing a broad illumination pattern that sufficiently illuminates the field of view captured by the image sensor 106A and the image sensor 106B. The illuminator source 102A may be a second illuminator source specially configured for producing a second illumination pattern that optimizes the illumination of the field of view captured by the image sensor 106B, specifically, in conjunction with the field capture optics 104B. In this regard, the specific configurations of the illuminator sources 102 may be optimized based on such intended usages.

The processor 108 comprises a computing device, and/or computer hardware, software, firmware, and/or a combination thereof, configured to perform various specially programmed operations and/or communicate with the various other components depicted with respect to the apparatus 100. In some embodiments, the processor 108 is embodied in processing circuitry configured for performing the operations described herein. In other embodiments, the processor 108 is embodied by a microprocessor. In yet other embodiments, the processor 108 is embodied by a CPU. In yet other embodiments, the processor 108 is embodied by one or more controllers and/or associated support hardware. The processor 108 may include, or otherwise be associated with, one or more memory devices storing instructions representing the various operations described herein, and/or for use in storing and/or receiving data objects and/or other data values for use in one or more programmed operations.

In some embodiments, for example, the processor 108 is configured to communicate with the illuminator sources 102. In this regard, the processor 108 may be configured to communicate with the illuminator sources 102 for transmitting one or more activation signals and/or deactivation signals. The activation signal may cause the recipient illuminator source of the illuminator sources 102 to begin producing light, and the deactivation signal may cause the illuminator source of the illuminator sources 102 to cease producing light. In some embodiments, the processor 108 is configured to store a reference to, or otherwise identify, the broadest illuminator source of the illuminator sources 102. In some embodiments, the broadest illuminator source of the illuminator sources 102 is connected to the processor 108 via a specific configuration indicating the illuminator source is the broadest illuminator source (e.g., connected via a predefined channel).

Additionally or alternatively, in some embodiments, for example, the processor 108 is configured to communicate with the image sensors 106. In this regard, the processor 108 may be configured to communicate with the image sensors 106 for transmitting one or more activation signals. The activation signal may cause the recipient image sensor of the image sensors 106 to capture an image data object and/or output the captured image data object. Further, in this regard, the processor 108 may be configured to communicate with the image sensors 106 to receive image data objects captured and outputted by the image sensors 106. In some embodiments, the processor 108 is configured to associate an image sensor of the image sensors 106 with an illuminator source of the illuminator sources 102. In this regard, the illuminator source of the illuminator sources 102 may be determined as the chosen illuminator source associated with the chosen image sensor of the image sensors 106 when the image sensor is determined as the chosen image sensor for an image processing operation.

The processor 108 may be configured to process the received image data objects for one or more image processing operations. For example, in some embodiments, the processor 108 is configured to process the captured image data objects for purposes of decoding machine readable symbology. In this regard, an exemplary function of the processor(s) may be to decode machine readable provided within the target or captured image data. One dimensional symbologies may be embodied in all sizes including very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. Further, 2D symbologies may include Aztec, Data Matrix, MaxiCode, QR Code, or other 2D symbologies. In other embodiments, the processor 108 is configured to process the captured image data objects for dimensioning of an object within a particular field. In yet other embodiments, the processor 108 is configured to process the captured image data objects for any other image processing operation. Additionally or alternatively, in some embodiments, the processor 108 is configured to process various data associated with controlling the various components depicted. For example, in some embodiments, the processor 108 is configured to generate and/or identify a sensor activation sequence for use in determining a chosen image sensor for capturing image data objects for a particular image processing operation. Additionally or alternatively, in some embodiments, the processor 108 is configured to process captured image data objects to perform one or more determinations regarding whether a chosen image sensor should remain chosen for a particular image processing operation, whether a currently deactivated illuminator source should be activated (e.g., to switch illuminators during processing), and/or the like. In this regard, the processor 108, and or one or more sub-assemblies thereof, is/are configured to enable processing of captured image data for purposes of successfully performing one or more image processing operations and controlling the corresponding components for completing the image processing task with controlled flicker.

In other embodiments, the apparatus 100 includes any number of components utilized for a particular intended operation. For example, in at least some embodiments, the apparatus 100 includes an aimer light emitter. In some embodiments, the aimer light emitter is associated with aimer pattern projection optics configured to enable an aimer pattern to be produced via the apparatus 100, for example for use by an operator and/or automated system in scanning one or more barcodes. Additionally or alternatively, in some embodiments, one or more components includes various subassemblies therein, each subassembly specially configured for performing particular functionality of the associated component. For example, in some embodiments, the processor 108 and/or illuminator sources 102 are associated with driver components configured for controlling activation and/or deactivation of the illuminator sources 102, and/or sensor drivers for controlling capture, for example via activation, by the image sensors 106.

FIG. 2 illustrates an example schematic block diagram including various computing hardware of an apparatuses 200A and 200B, in accordance with at least some example embodiments of the present disclosure. It should be appreciated that the illustrated apparatuses 200A and 200B are non-limiting example embodiments of the present disclosure. As such, the specific components depicted therein, alone or in combination, should be considered to limit the scope or spirit of the disclosure.

The apparatuses 200A and 20B include a plurality of source driver circuitry, specifically LED driver 202A and laser driver 202B. It should be appreciated that, in this regard, the drivers are configured to control the activation and/or deactivation of various light-emitting components. For example, the LED driver 202A may be configured to control activation of one or more illuminator sources, for example a broadest illuminator source and/or one or more other illuminator sources, based on one or more control settings (e.g., an illuminator change time threshold). Additionally or alternatively, for example, the laser driver 202B may be configured to control activation of one or more laser sources, for example a laser diode embodying an aimer emitter for use in detecting and/or scanning one or more barcodes. It should be appreciated that the aimer driver 202B may be configured to control the aimer emitter based on one or more control settings Each of the illuminator source driver circuitry 202A and 202B are configured in communication with a processor 204. Specifically, as illustrated, the processor 204 is configured to control the various communicable components, either directly or via communication with the connector 208. It should be appreciated that the processor 204 may be specially configured to perform one or more of the operations described herein via communication with the various computing hardware depicted.

Further, the apparatuses 200A and 200B each include imaging computing hardware 206. The imaging computing hardware 206 includes specially configured image sensors for capturing image data objects from a surrounding environment within a particular field of view. Additionally, in this regard, the imaging computing hardware 206 includes a plurality of oscillators for controlling each respective image sensor. In this regard, the oscillators may function to ensure the image sensors capture at a desired throughput rate for processing. It should be appreciated that the oscillators may be configured to control the sensors at a desired rate based on various requirements, parameters, and/or configurations of each corresponding sensor.

Further still, the imaging computing hardware 206 further comprises switch functionality for controlling and/or otherwise changing between the activated sensors. In this regard, the MIPI_SWITCH, for example, may provide for alternating the data bus between the first image sensor (Sensor1, e.g., 210) and the second image sensor (Sensor2, e.g., 212). In some embodiments, the MIPI_SWITCH, or an equivalent component, is provided to enable reading from one image sensor at a time. It should be appreciated that the MIPI_SWITCH may be an optional component, and thus in some embodiments the MIPI_SWITCH is not included. The particular components illustrated may be included, in some examples, to minimize controller hardware required for controlling the first and second image sensors for purposes of performing image capture.

It should be appreciated that the connector 208 is configured to provide connector functionality associated with the various computing hardware therein. In this regard, the connector may provide input/output functionality for interfacing with one or more associated devices, circuitry, and/or the like. Additionally or alternatively, the connector 208 may enable data reading from and/or writing to (e.g., for configuration) one or more of the depicted components Example Illumination Projection Visualization Having described various example apparatuses and components thereof, example illumination projection visualizations are described below in accordance with example embodiments of the present disclosure. In this regard, it should be appreciated that the example illumination projections are provided merely for explanatory and visualization purposes. Further, it should be appreciated that the disclosure is not limited to merely the depicted illumination projections. Accordingly, such visualizations are not to limit the scope and spirit of the disclosure.

FIG. 3 illustrates an example visualization of example illumination projections in accordance with example embodiments of the present disclosure. Specifically, FIG. 3 illustrates an example broad illumination pattern 302 and an example narrow illumination pattern 304. Each of the example illumination patterns 302 and 304 may be produced by a corresponding illuminator source, for example of a multi-sensor imaging apparatus such as apparatus 100.

The illumination patterns 302 and 304 may be utilized to identify a broadest illuminator source of the plurality of illuminator sources associated with a particular embodiment. It should be appreciated that the plurality of illuminator sources may include any number of illuminator sources, the illuminator sources configured to generate illumination patterns of varying widths. For example, in other embodiments, three or more illuminator sources may be provided to generate three different illumination patterns, where one of the illumination patterns is a "broadest illumination pattern" with respect to a particular direction (e.g., a width).

As illustrated, the broad illumination pattern 302 embodies the broadest illumination pattern. In this regard, the broad illumination pattern 302 is associated with a first illumination width 306. The first illumination width 306 represents the size of the broad illumination pattern 302 in the x-direction (e.g., left-right as illustrated). The narrow illumination pattern 304 is associated with a second illumination width 308. The second illumination width is less than the first illumination width 306, indicating that the broad illumination pattern 302 is the broadest of the projected illumination patterns.

Accordingly, in some embodiments, the illuminator source associated with the broad illumination pattern 302 may be predetermined as the broadest illuminator source. For example, in this regard, the broadest illuminator source may be connected with one or more controllers and/or processors in a particular manner such that the controllers and/or processors identify the broadest illuminator source as such. In other embodiments, the broadest illuminator source may be determined based on a comparison between one or more produced illumination patterns. For example, in some embodiments, computing hardware such as one or more controllers and/or processors may be configured to capture the illumination patterns 302 and 304, for example using one or more image sensors, and compare the captured data to identify the broadest illumination pattern. In some such embodiments, the computing hardware may store and/or otherwise maintain a reference to the identified broadest illuminator source. The reference to the broadest illuminator source may be utilized in transmitting one or more activation signals, and/or deactivation signals, to the broadest illuminator source during operation.

In other embodiments, one or more alternative directions are considered for determining an initial illuminator source. For example, in some embodiments, the broadest illuminator source is determined based on the height of each illumination pattern. In this regard, the broad illumination pattern 302 and narrow illumination pattern 304 may be compared based on their corresponding illumination heights. In this regard, the corresponding illuminator source may be selected based on the larger height and/or larger width illumination pattern.

In other embodiments, it should be appreciated that one or more alternative illumination patterns may be generated, for example by one or more illuminator sources together with corresponding illumination pattern projection optics such as one or more lenses. For example, in at least one other embodiment, the illumination pattern generated may be of an aspect ratio that matches an aspect ratio of a corresponding image sensor, or is of a shape associated with an aspect ratio that is within a determined threshold (in one or both directions) from a second aspect ratio associated with the corresponding image sensor. Additionally or alternatively, in at least one other embodiment, the illumination pattern generated may be circular, a defined elliptical shape, and/or of another predefined shape.

Example Operations of the Present Disclosure

Having described various example apparatuses and components thereof, as well as example illumination projection visualizations, example operations for flicker control in a multi-sensor environment are described below in accordance with example embodiments of the present disclosure. In this regard, it should be appreciated that the operations depicted herein may be implemented as example computer-implemented processes, for example to be implemented via specific computing hardware, devices, components, and/or the like as described herein. Additionally or alternatively, the operations may be performed by embodiment apparatuses and/or computer program products, for example as described herein. Additionally or alternatively, it should be appreciated that the described processes may include one or more optional operations (depicted in dashed or "broken" lines). In some embodiments, none, some, or all of the optional operations are performed within the example embodiments described herein.

FIG. 4 illustrates an example flowchart including example operations for flicker control in a multi-sensor environment, in accordance with at least some example embodiments of the present disclosure. The example operations embody a process (or "method") 400. In some embodiments, it should be appreciated that the example operations embody a computer-implemented process to be performed by an apparatus, for example the apparatus 100 described with respect to FIG. 1 above, and/or by one or more hardware components, for example those described with respect to FIG. 2 above.

At optional block 402, the process 400 includes initializing a plurality of image sensors associated with a sensor activation sequence. In some embodiments, the sensor activation sequence is generated for a plurality of image sensors associated with a particular imaging apparatus, for example a multi-sensor imaging apparatus. The sensor activation sequence may represent a particular order that the image sensors are to be tested for purposes of determining a chosen image sensor for a particular image processing operation. In some embodiments, the sensor activation sequence is predetermined based on one or more algorithms, for example where the sensor activation sequence represents activation of the image sensors in a sequential order. In other embodiments, the sensor activation sequence comprises a randomized sensor activation sequence that represents a randomized order of the image sensors. In at least some embodiments, the plurality of image sensors may have been previously configured based on the sensor activation sequence, such that subsequent initialization is not required.

At block 404, the process 400 includes activating a broadest illuminator source of a plurality of illuminator sources. In some embodiments, the broadest illuminator source is predetermined, for example such that a controller, processor, and/or other computing hardware is preconfigured to transmit an activation signal along a signal line predetermined to be associated with a broadest illuminator. In other embodiments, the broadest illuminator source may be determined by communicating with one or more sensors and/or each of the illuminator sources. For example, in some embodiments, one or more image data objects may be captured and analyzed, each illuminated by a different illuminator source of the plurality of illuminator sources, to determine which illuminator is associated with the broadest illumination pattern (e.g., spanning the greatest horizontal field of view).

In other embodiments, the initial illuminator source is selected based on one or more alternative parameters of the illuminator sources. For example, in some embodiments, the brightest illuminator source of a plurality illuminator source is activated as the initial illuminator source, for example where the brightest illuminator source generates an illumination pattern at a highest brightness level. Additionally or alternatively, in some embodiments, an illuminator source associated with a particular wavelength is activated as the initial illuminator source, for example the illuminator source associated with the shortest wavelength or the illuminator source associated with the largest wavelength. In other embodiments, any other parameter values for a plurality of sensors may be utilized to determine an initial illuminator source for activating.

At block 406, the process 400 includes determining, based on a plurality of image sensors and a sensor activation sequence, a chosen image sensor of the plurality of image sensors for an image processing operation. In this regard, the chosen image sensor may be determined to capture and/or likely capture image data objects that are determined to most likely be successfully processed by one or more components, for example by a processor associated with the chosen image sensor. In this regard, the processor could determine, based on an attempt to decode a barcode or other symbology data, for example, that the image data object will likely decode without error, indicating that the corresponding image sensor is likely to capture image data objects that may be processed to successfully complete, or complete in the most efficient processing time, and/or the like, for the image processing operation. Additionally or alternatively, the processor may determine which of the plurality of image sensors has the least logged image processing errors and/or failures. Additionally or alternatively, in some embodiments the processor is configured to identify an ambient light level associated with each captured image data object and determines the chosen image sensor based on the lowest level of detected ambient light. Additionally or alternatively, in some embodiments the processor is configured to determine the chosen image sensor based on the processing speed associated with corresponding captured image data objects (e.g., where the image sensor that captures image data objects that can be processed the fastest is determined and/or otherwise set as the chosen image sensor).

In some embodiments, at least one of the plurality of image sensors is tested to determine if the image sensor is the chosen image sensor for the image processing operation.

In some embodiments, each of the image sensors is tested, for example one at a time based on the sensor activation sequence. Alternatively, in some embodiments, only a subset of the plurality of image sensors are tested (e.g., until a chosen image sensor is determined). In this regard, for example, the image sensors may be activated for testing in a predetermined order that enables, based on one or more image processing algorithms, determination that subsequent image sensors will not provide more desirable image data objects based on one or more parameters associated with the image sensors (e.g., active-pixel resolution, focal distances, and/or the like) or parameters associated with the captured image data objects (e.g., a transition from improving sharpness to decreasing sharpness, indicating that a focal distance closest to a desirable focal distance has already been tested).

The chosen image sensor may be selected using any of a number of image processing operations. In at least one example context, the chosen image sensor is determined based on a calculated measure of image sharpness for the captured image data objects. In some such embodiments, one or more image processing algorithms are used to determine an image sharpness parameter value for each captured image data object, where the value represents the sharpness of the image data object. Once it is determined that a particular image sensor is associated with the image sharpness parameter value indicative of the best image sharpness (e.g., which may be the greatest value, lowest value, closest to a desirable threshold value, or determined based on another mathematical operation), the particular image sensor may be determined as the chosen image sensor. In at least one example, the chosen image sensor represents the image sensor of a plurality of image sensors that is best in focus. In at least one example context, additionally or alternatively in some embodiments, a chosen image sensor is determined based on whether or not the image data object captured by the image sensor could be successfully decoded, and/or how quickly the image data object could be successfully decoded. It should be appreciated that, in some embodiments such as embodiments for decoding one or more symbologies, a subset of the image sensors each successfully decode based on the captured image data objects. In some such circumstances, embodiments may select based on one or more other parameters (e.g., selecting the image sensor that decoded faster), or determine the chosen image sensor based on a subsequent algorithm based on the subset (e.g., selecting randomly or in a sequence from the subset that was utilized for successfully decoding the image data objects).

Additionally or alternatively, in some embodiments, the chosen image sensor is chosen based on one or more predefined sequences (e.g., alternating between two image sensor after every capture, or alternating after a predetermined number of captures). In some such embodiments, the predefined sequence may include the same number of captures for each image sensor, or a different number of captures for one or more image sensors (e.g., four captures using a first image sensor, then one capture using a second image sensor). Additionally or alternatively still, in some embodiments, one or more image processing determinations is/are used in determining the sequence for choosing an image sensor (e.g., capture a predetermined first number of image data objects with a first image sensor, then determine a second number of images to capturing using a second sensor based on one or more of the previously captured image data objects from the first sensor, and capture the second number of image data objects using the second image sensor).

In at least some embodiments, the chosen image sensor is determined based on a determination that a predicted target focal distance associated with an image sensor is predicted to most closely match a desired focal range for the particular image processing operation, or particular stage thereof. For example, the distance from a particular field may be measured by an apparatus and/or component thereof, or input by an associated user, and utilized in determining the corresponding desired focal range. In this regard, the image data object may be processed to determine a sensor focus distance for one or more image sensors, and determine which of the image sensors is associated with a sensor focus distance closest to the predicted target focal distance. One example process for determining the chosen image sensor of the plurality of image sensors for the image processing operation is described below with respect to FIG. 5.

At block 408, the process 400 includes activating a chosen illuminator source of the plurality of illuminator sources, the chosen illuminator source associated with the chosen image sensor. In some embodiments, computing hardware, for example a controller and/or other processor, is arranged such that each of the plurality of image sensors is associated with a particular illuminator sources of the plurality of illuminator sources. The illuminator source associated with each image sensor may be specifically configured based on the corresponding image sensor. For example, the illumination pattern, intensity, and/or other parameters associated with the illuminator source is configured based on desirable values corresponding to parameters associated with the associated image sensor. In this regard, the chosen illuminator source for a particular image sensor produces an illumination pattern configured to illuminate a desired field in a preconfigured manner. In other embodiments, one or more image sensors are associated with a shared illuminator source.

At optional block 410, the process 400 includes capturing an image data object using the chosen image sensor. In some embodiments, computing hardware, for example a controller and/or other processor, activates the chosen image sensor to cause the image sensor to capture the image data object. In this regard, the computing hardware may transmit one or more activation signals to the chosen image sensor. The image data object may represent light captured by the image sensor, for example based on the illumination provided by the active chosen illuminator source. In this regard, the image data object may be of a particular pixel resolution (e.g., a number of data rows and data columns) representing light captured within a certain field.

At optional block 412, the process 400 includes processing the image data object based on the image processing operation. It should be appreciated that the image data object may be processed for any of a myriad of purposes. For example, in at least some embodiments, the image processing operation embodies processing the image data object for a particular image processing task, for example bar code detection and/or decoding, dimensioning, and/or the like. Additionally or alternatively, the image data object may be processed to determine whether the chosen image sensor should remain chosen for the image processing operation (e.g., based on a determined sharpness parameter value and/or another image data parameter value). In this regard, the image processing operation may update to a new stage upon processing the image data object. With regard to the new stage of the image processing operation, the chosen image sensor may remain, or a new image sensor may be determined as chosen to best continue towards completing the image processing operation. In this regard, the image frame data object may be processed to determine whether the chosen image sensor should remain chosen (e.g., by processing the image data object to identify one or more parameters associated with captured image data objects indicating the corresponding image sensor is likely to capture image data objects having desired parameter values, such as a lowest white-level, a determined focus, and/or the like) or whether the chosen image sensor should be changed to a new chosen image sensor.

FIG. 5 illustrates an example flowchart including additional example operations for flicker control in a multi-sensor environment, specifically for determining, based on a plurality of image sensors and a sensor activation sequence, a chosen image sensor of the plurality of image sensors for an image processing operation, in accordance with at least some example embodiments of the present disclosure. The example operations embody a process (or "method") 500. In some embodiments, it should be appreciated that the example operations embody a computer-implemented process to be performed by an apparatus, for example the apparatus 100 described with respect to FIG. 1 above, and/or by one or more hardware components, for example those described with respect to FIG. 2 above.

In at least some embodiments, the process 500 occurs after one or more blocks of the process 400. In this regard, the process 500 may begin after block 404 as described with respect to FIG. 4, for example as an example implementation of block 406. Further, it should be appreciated that, upon completion of the process 500, the example process may flow to one or more subsequent operations depicted with respect to FIG. 4, or to another block of another sub-process, for example depicted with respect to one of the remaining figures.

At block 502, the process 500 includes setting a selected image sensor of a plurality of image sensors based on a sensor activation sequence. In this regard, the sensor activation sequence may represent an ordered index of image sensors to be selected for testing. In some such embodiments, the sensor activation sequence includes image sensor identifiers, each for use in selecting and/or activating a corresponding image sensor. In some embodiments, the sensor activation sequence is initialized, and/or otherwise generated, at one or more earlier blocks, for example optional block 402 described above. It should be appreciated that, in some embodiments, to set the selected image sensor, computing hardware such as a controller or other processor is configured to transmit a signal to the selected image sensor. It should be appreciated that upon being set the selected image sensor may be configured for capturing an image data object, for example upon activation by the computing hardware and/or additional computing hardware.

At block 504, the process 500 includes activating the selected image sensor to capture an image data object. In some embodiments, computing hardware, such as one or more controllers and/or other processors is configured to transmit an activation signal to the selected image sensor to cause the image sensor to capture the image data object. The image data object may represent a field of view illuminated by an activated broadest illuminator source. In this regard, the captured image data object represents particular data within the field of view associated with the selected image sensor, which may be configured for capturing data associated with a particular field of view, focal distance, and/or the like.

At block 506, the process 500 includes processing the image data object to determine whether the selected image sensor should be the chosen image sensor for the image processing operation, where the chosen image sensor is set to the selected image sensor upon determining the selected image sensor should be the chosen image sensor for the image processing operation. In some embodiments, computing hardware such as one or more controllers and/or processors process the image data object to determine whether one or more image parameter values are within a desired threshold. In some embodiments, the image data object is processed based on the sensor activation sequence, for example to determine whether a subsequent image sensor (e.g., a larger or smaller image sensor) is likely to capture a better image data object (e.g., better white-level, better focused image data object, and/or the like). Additionally or alternatively, in some embodiments, the image data object is processed in comparison to a previously processed image data object, for example determined via a previous iteration associated with a different image sensor of the plurality of image sensors that is determined as a temporary chosen image sensor. In some such embodiments, the processing steps are repeated for each of the plurality of image sensors to determine which should be chosen for use in capturing image data objects for processing for an image processing operation based on the corresponding captured image data objects.

At decision block 508, the process 500 includes determining whether the chosen image sensor has been successfully determined. In a circumstance where the chosen image sensor is determined, the process flow continues and/or ends. In a circumstance where the chosen image sensor is not determined, the process flow returns to block 502. Upon returning to block 502, one and/or more of the blocks 502-506 are repeated for the next image sensor represented in the sensor activation sequence. In this regard, the process includes processing various image data objects from various image sensors of the plurality of image sensors until a chosen image sensor is determined. In some embodiments, the chosen image sensor is determined without processing an image data object from all of the plurality of image sensors (e.g., where the image data object is processed to determine one or more image parameter values are within desired thresholds and/or otherwise indicate that subsequent image sensors will not produce better image data objects for the image processing operation). In other embodiments, the chosen image sensor is determined after processing an image data object from all of the plurality of image sensors (e.g., by tracking a temporary chosen image sensor representing which image sensor is determined as most likely to produce image data objects that can be successfully processed without error, or can capture image data objects the fastest, or the like, of the tried image sensors based on one or more algorithms and/or processes, until each image sensor has been tried, and then choosing the chosen image sensor by setting the chosen image sensor to the temporary chosen sensor upon completing for all of the plurality of image sensors).

FIG. 6 illustrates an example flowchart including additional example operations for flicker control in a multi-sensor environment, specifically for continuing an image processing operation based on a chosen image sensor, in accordance with at least some example embodiments of the present disclosure. The example operations embody a process (or "method") 600. In some embodiments, it should be appreciated that the example operations embody a computer-implemented process to be performed by an apparatus, for example the apparatus 100 described with respect to FIG. 1 above, and/or by one or more hardware components, for example those described with respect to FIG. 2 above.

In at least some embodiments, the process 600 occurs after one or more blocks of the process 400. In this regard, the process 600 may begin after optional block 412 as described with respect to FIG. 4. Further, it should be appreciated that, upon completion of the process 600, the example process may end, flow to one or more subsequent operations depicted with respect to FIG. 4, or to another block of another sub-process, for example depicted with respect to one of the remaining figures.

At block 602, the process 600 includes determining, based on the image data object, the chosen image sensor should remain chosen for the image processing operation. In this regard, the image data object may be processed again based on a newly reached stage of the image processing operation (e.g., after completion of a previous stage by processing the image data object). In this regard, computing hardware such as one or more controllers and/or other processors may process the image data object with respect to one or more parameters and/or the like. In some such embodiments, the image data object is processed with respect to different parameters than previously utilized in determining the chosen image sensor at a previous block. For example, the image data object may be processed to identify parameter values for new image parameters associated with a newly reached stage of the image processing operation.

At block 604, the process 600 includes capturing a second image data object using the chosen image sensor. In some embodiments, computing hardware such as one or more controllers and/or other processors, again activates the chosen image sensor to cause the chosen image sensor to capture the second image data object. In this regard, the computing hardware may transmit one or more activation signals to the chosen image sensor for a second time. In some embodiments, by the chosen image sensor remaining the same, subsequent initialization of another image sensor and/or corresponding illuminator source is not required. Such embodiments may improve throughput, power consumption, and/or response time associated with the process over conventional implementations.

At block 606, the process 600 includes processing the second image data object based on the image processing operation. It should be appreciated that, in some embodiments, the second image data object is similarly processed to complete a particular stage of the image processing operation. For example, in at least some embodiments, the second image data object is processed to complete a subsequent step of a particular image processing task that is to be completed upon successfully processing the earlier-received first image data object. Processing the second image data object may similarly progress the image processing operation to a new stage, for example where the image processing operation includes any number of stages.

It should be appreciated that, in some embodiments, a chosen image sensor is utilized to capture any number of image data objects for processing. In this regard, in some embodiments, blocks 602-606 are repeated any number of times for any number of subsequent image data objects. For example, the chosen image sensor may be determined based on one or more determinations and/or algorithmic processes for use in several stages of the image processing operation. As such, an example process may continue to determine the chosen image sensor should remain the chosen image sensor for the image processing operation, for example because no other image sensor is determined to chosen based on one or more determinations and/or algorithmic processes, and thus continue to utilize the chosen image sensor for capturing and processing image data objects any number of image data objects. In some embodiments, the computing hardware may not check whether the chosen image sensor should remain for the image processing operation after each capture and processing iteration. For example, in some embodiments, block 602 is repeated only after a certain predetermined and/or determined time interval and/or a predetermined and/or determined number of captures.

FIG. 7 illustrates an example flowchart including additional example operations for flicker control in a multi-sensor environment, specifically for continuing an image processing operation based on a new chosen image sensor, in accordance with at least some example embodiments of the present disclosure. The example operations embody a process (or "method") 700. In some embodiments, it should be appreciated that the example operations embody a computer-implemented process to be performed by an apparatus, for example the apparatus 100 described with respect to FIG. 1 above, and/or by one or more hardware components, for example those described with respect to FIG. 2 above.

In at least some embodiments, the process 700 occurs after one or more blocks of the process 400. In this regard, the process 700 may begin after optional block 412 as described with respect to FIG. 4. Further, it should be appreciated that, upon completion of the process 600, the example process may end, flow to one or more subsequent operations depicted with respect to FIG. 4, or to another block of another sub-process, for example depicted with respect to one of the remaining figures.

At block 702, the process 700 includes determining, based on the image data object, the chosen image sensor should no longer be chosen for the image processing operation. In this regard, the image data object may be processed again based on a newly reached stage of the image processing operation (e.g., after completion of a previous stage by processing the image data object) to determine the image data object indicates the chosen image sensor should no longer be chosen (e.g., is no longer most likely to capture image data objects predicted to be successfully processed, no longer captures image data objects that are most clear or have the least ambient light, or the like). In this regard, computing hardware such as one or more controllers and/or other processors may process the image data object with respect to one or more parameters and/or the like. In some such embodiments, the image data object is processed with respect to different parameters than previously utilized in determining the chosen image sensor at a previous block. For example, the image data object may be processed to identify parameter values for new image parameters associated with a newly reached stage of the image processing operation. It should be appreciated that, in other embodiments, the computing hardware determines the chosen image sensor should no longer be chosen for the image processing operation based on an image data object expiration time, and/or one or more other determinations with respect to metadata associated with the captured image data object.

In some embodiments, the determination that the chosen image sensor should no longer be chosen for the image processing operation is determined based on one or more predetermined image capture sequences. For example, in some embodiments, the chosen image sensor is utilized only for a predetermined number of captures, and a new chosen image sensor is to be determined upon completion of the predetermined number of captures. In other embodiments, determining the chosen image sensor should no longer be chosen for the image processing operation includes capturing one or more image data objects using an image sensor of the plurality of image sensors other than the chosen image sensor, and processing other image data object(s) captured by the other image sensor to determine if such image data objects are associated with one or more preferable image data parameters (e.g., quality, sharpness, white-level, brightness, or other parameters having values closer to a desired threshold value). Alternatively or additionally, in some embodiments, determining the chosen image sensor should no longer be chosen for the image processing operation includes detecting one or more significant changes in control of the chosen image sensor. For example, in at least some embodiments, the exposure control associated with capturing via the chosen image sensor may be changed between stages of the image processing operation to target an object in a second field (e.g., changing from focus on a near-field to focus on a far-field). In this example context, in some such embodiments, the process may include detecting that the exposure requirements controlling the chosen image sensor are significantly different and, thus, a new chosen image sensor should be determined. It should be appreciated that, in other embodiments, one or more other control signals affecting image sensor capture and/or operation may be processed for determining the chosen image sensor should no longer be chosen.

At block 704, the process 700 includes reactivating the broadest illuminator source. In some embodiments, In some embodiments, computing hardware such as one or more controllers and/or processors is/are configured to transmit another activation along a signal line predetermined to be associated with the broadest illuminator source to cause reactivation. In other embodiments, the broadest illuminator source is determined from the plurality of image sensors (e.g., by testing the various image sensors of the plurality of image sensors) such that the computing hardware may transmit a corresponding activation signal to the broadest illuminator source. In this regard, the computing hardware may reactivate the broadest illuminator source in a similar manner to the process described above with respect to block 404.

At block 706, the process 400 includes determining, based on the plurality of image sensors and the sensor activation sequence, a new chosen image sensor of the plurality of image sensors for the image processing operation. In this regard, the chosen image sensor may represent the image sensor that captures image data determined to be most likely to be successfully processed by one or more components for completing at least a portion of the image processing operation (e.g., a next stage of the image processing operation). In this regard, at least one of the plurality of image sensors is again tested to determine if the image sensor is the new chosen image sensor. In some embodiments, each of the image sensors is again tested, for example one at a time based on the sensor activation sequence, a restarted activation sequence, or a newly generated sensor activation sequence. In some such embodiments, the image sensors are each tested based on new image parameters and/or image parameter values for comparison, for example where the new image parameters and/or image parameter values are utilized to determine a new chosen image sensor that captures image data objects that are determined to be best based on one or more determination algorithms and/or processes for the new stage of the image processing operation (e.g. highest processing rate, highest capture rate, lowest white-level, clearest image data, and/or the like).

At block 708, the process 700 includes activating a new chosen illuminator source of the plurality of illuminator sources, where the new chosen illuminator source is associated with the new chosen image sensor. In some embodiments, computing hardware such as one or more controllers and/or other processors, is specially configured to identify the illuminator source associated with the determined new chosen image sensor. It should be appreciated that the chosen illuminator source may be identified automatically based on the determined chosen image sensor. Additionally or alternatively, as described above, in some embodiments, the computing hardware is configured to activate the new chosen illuminator source by generating and/or transmitting an activation signal to the new chosen illuminator source. In some embodiments, the new chosen illuminator source is configured to remain active until a deactivation signal is received. In other embodiments, the new chosen illuminator source is configured to remain active for a predetermined and/or determined length of time, and/or a predetermined and/or determined number of captures by the corresponding new chosen image sensor.

It should be appreciated that, in some embodiments, in addition to activating the new chosen illuminator source the process includes deactivating the broadest illuminator source. For example, in some embodiments, the computing hardware is configured to generate and/or transmit a deactivation signal to the broadest illuminator source to cause such a deactivation. Alternatively, in at least some embodiments, the broadest illuminator source automatically deactivates in response to the generation and/or transmission of an activation signal to the new chosen image sensor.

FIG. 8 illustrates yet another example flowchart including alternative example operations for flicker control in a multi-sensor environment, in accordance with at least some alternative example embodiments of the present disclosure. The example operations embody a process (or "method") 800. In some embodiments, it should be appreciated that the alternative example operations embody a computer-implemented process to be performed by an apparatus, for example the apparatus 100 described with respect to FIG. 1 above, and/or by one or more hardware components, for example those described with respect to FIG. 2 above.

At block 802, the process 800 includes activating, of a broadest illuminator source and at least a second illuminator source, the broadest illuminator source, wherein the broadest illuminator source is associated with a first image sensor and the second illuminator source is associated with a second image sensor. For example, in some embodiments, the broadest illuminator source and the second illuminator source are two illuminator sources within a multi-sensor imaging apparatus, which may include any number of illuminator sources. In some embodiments, the broadest illuminator source is predetermined, for example such that computing hardware such as one or more controllers and/or other processors, is preconfigured to transmit an activation signal along a signal line predetermined to be associated with the broadest illuminator source. In other embodiments, the broadest illuminator source may be determined by communicating with one or more image sensors, for example the first image sensor and second image sensor, and/or one or more of the broadest illuminator source and second illuminator source. For example, in some embodiments, one or more image data objects may be captured via one or more of the image sensors and analyzed, each image data object illuminated by a different illuminator source of the broadest illuminator source and the second illuminator source, to determine which illuminator source is associated with the broadest illumination pattern (e.g., spanning the greatest horizontal field of view). In some such embodiments, the illuminator source associated with the broadest illumination pattern represents the broadest illuminator source.

At block 804, the process 800 includes capturing, using at least one of the first image sensor and the second image sensor, an image data object set for processing associated with an image processing operation. In some embodiments, the image data object set is captured utilizing only one of the first image sensor or the second image sensor. For example, in some such embodiments, the first image data object set is captured by a broadest image sensor associated with the broadest illuminator source, where the broadest image sensor comprises the first image sensor or the second image sensor. In other embodiments, the first image data object set is captured utilizing a combination of the first image sensor and the second image sensor. For example, in some embodiments, computing hardware such as one or more controllers and/or one or more processors cause capturing of the image data object set based on a predetermined activation pattern between the first image sensor and the second image sensor. In one example embodiment, the first image sensor and second image sensor may be activated, to capture an image data object, in an alternating pattern (e.g., activate first image sensor, activate second image sensor, activate first image sensor, activate second image sensor, and the like). In another example embodiment, the first image sensor and the second image sensor are activated based on another predetermined activation sequence (e.g., a predetermined number of captures for each image sensor before alternating, or a particular sequence of captures associated with the first image sensor and second image sensor). In yet other example embodiments, the computing hardware determines the number of image data objects to capture by processing one or more image data objects as and/or after each is captured (e.g., capture image data objects from the first image sensor until one or more image parameter values reach a certain threshold, then capture image data objects from the second image sensor). As such, any capture sequence may be utilized for capturing any number of image data objects using the first image sensor and/or second image sensor.

At block 806, the process 800 includes determining the second illuminator source should be activated based on one or more activation determinations. In this regard, the activation determinations may include one or more logic rules for determining whether the second illuminator source should be activated. The activation determinations may include any number of predetermined comparisons, algorithms, and/or processing steps to be performed in making such a determination. In some embodiments, the activation determinations include one or more determinations regarding a length of time since activation of the broadest illuminator source. Additionally or alternatively, in some embodiments, the activation determinations include one or more determinations regarding a number of captured image data objects. Additionally or alternatively, in some embodiments, the activation determinations include one or more determinations based on processing one or more of the captured image data objects in the image data object set. A non-limiting example process for determining the second illuminator source should be activated may be based on one or more of the activation determinations as described below with respect to FIG. 10.

At optional block 808, the process 800 includes deactivating the broadest illuminator source. In some embodiments, computing hardware such as one or more controllers and/or other processors, is specially configured to generate and/or transmit a deactivation signal to the broadest illuminator source. Additionally or alternatively, in some embodiments, the broadest illuminator source is automatically deactivated in response to generation and/or transmission of an activation signal to another illuminator source (e.g., to the second illuminator source). In some such embodiments, the broadest illuminator source is deactivated to enable a subsequently activated illuminator source (e.g., the second illuminator source) to operate without interference by the broadest illuminator source. Additionally or alternatively, by deactivating the broadest illuminator source, the process may conserve processing and/or power resources by reducing the number of activated components. It should be appreciated that, in other embodiments, the broadest illuminator source may remain active in conjunction with one or more subsequently activated illuminator sources (e.g., the second illuminator source).

At block 810, the process 800 includes activating the second illuminator source. In some embodiments, computing hardware such as one or more controllers and/or processors, is specially configured to generate and/or transmit one or more activation signals to the illuminator source. The activation signal may be configured to cause activation of the second illuminator source once the activation signal is received. It should be appreciated that, in some embodiments, the second illuminator source is configured to differ from the broadest illuminator source based on one or more parameter values (e.g., an illumination pattern height and/or width, an intensity level and/or intensity distribution, and/or the like). In this regard, the second illuminator source may produce illumination that affects a different field than the illumination produced by the broadest illuminator source and/or affects a particular field differently than the illumination produced by the broadest illuminator source. For example, the second illuminator source may be specially configured to produce a second illumination pattern that is designed to specifically improve the clarity of image data objects captured by one or more of the image sensors (e.g., the clarity of the image data objects captured by the second image sensor).

At block 812, the process 800 includes capturing, using at least one of the first image sensor and the second image sensor, a second image data object set for processing associated with an image processing operation. In this regard, the second image data object set comprises image data objects illuminated at least by the second illuminator source. As such, the field may be illuminated differently in comparison to illumination by the broadest illuminator source, for example based on a difference in illumination pattern and/or intensity, or the like. As such, the data values of the image data objects within the second image data object set may reflect different data values based on the changed illumination. In this regard, the second image data object set may be utilized to successfully complete an image processing operation (or one or more steps thereof) that could not be successfully completed based on the earlier captured first image data object set.

It should also be appreciated that the second image data object set may include image data objects captured by either and/or both of the first image sensor and the second image sensor. For example, in some embodiments where the second illumination sensor is specifically configured to provide illumination based on the second image sensor, the second image data object set may be captured utilizing only the second image sensor so as to capture the best clarity image data objects possible for processing while the second illuminator source is active. In other embodiments, the second image data object set is captured utilizing a combination of the first image sensor and the second image sensor. For example, in some embodiments, computing hardware such as one or more controllers and/or one or more processors cause capturing of the second image data object set based on a second predetermined activation pattern between the first image sensor and the second image sensor, where the second predetermined activation pattern may be the same as or different than the predetermined activation pattern utilized to capture the first image data object set. In one example embodiment, the first image sensor and second image sensor may be activated, to capture an image data object, in an alternating pattern (e.g., activate first image sensor, activate second image sensor, activate first image sensor, activate second image sensor, and the like). In another example embodiment, the first image sensor and the second image sensor are activated based on another predetermined activation sequence (e.g., a predetermined number of captures for each image sensor before alternating, or a particular sequence of captures associated with the first image sensor and second image sensor). In yet other example embodiments, the computing hardware determines the number of image data objects to capture for the second image data object set by processing one or more image data objects as and/or after each is captured (e.g., capture image data objects from the first image sensor until one or more image parameter values reach a certain threshold, then capture image data objects from the second image sensor). It should be appreciated that, for the second image data object set, any capture sequence may be utilized for capturing any number of image data objects using the first image sensor and/or second image sensor.

FIG. 9 illustrates an example flowchart including additional example operations for flicker control in a multi-sensor environment, specifically for reactivating a broadest illuminator source for utilization in capturing one or more image data objects, in accordance with at least some example embodiments of the present disclosure. The example operations embody a process (or "method") 900. In some embodiments, it should be appreciated that the example operations embody a computer-implemented process to be performed by an apparatus, for example the apparatus 100 described with respect to FIG. 1 above, and/or by one or more hardware components, for example those described with respect to FIG. 2 above.

In at least some embodiments, the process 900 occurs after one or more blocks of the process 800. In this regard, the process 900 may begin after block 812 as described with respect to FIG. 8. Further, it should be appreciated that, upon completion of the process 900, the example process may end, flow to one or more subsequent operations depicted with respect to FIG. 8, or to another block of another sub-process, for example depicted with respect to one of the remaining figures.

At block 902, the process 900 includes determining the broadest illuminator source should be reactivated based on a second activation determination set including one or more activation determinations. In some embodiments, the second activation determination set includes one or more logic rules for determining whether the broadest illuminator source should be reactivated. The activation determinations may include any number of predetermined comparisons, algorithms, and/or processing steps to be performed in making such a determination. In some embodiments, the activation determinations include one or more determinations regarding a length of time since activation of another illuminator source (e.g., the second illuminator source), and/or a length of time since deactivation of the broadest illuminator source. Additionally or alternatively, in some embodiments, the activation determinations include one or more determinations regarding a number of captured image data objects while the second illuminator source is activated. Additionally or alternatively, in some embodiments, the activation determinations include one or more determinations based on processing one or more of the captured image data objects, for example from the second image data object set. A non-limiting example process for determining the broadest illuminator source should be activated based on one or more activation determinations may be based on one or more of the activation determinations as described below with respect to FIG. 10.

At optional block 904, the process 900 includes deactivating the second illuminator source. In some embodiments, computing hardware such as one or more controllers and/or other processors, is specially configured to generate and/or transmit a deactivation signal to the second illuminator source. Additionally or alternatively, in some embodiments, the second illuminator source is automatically deactivated in response to generation and/or transmission of an activation signal to the broadest illuminator source and/or another illuminator source (e.g., a third or greater illuminator source). In some such embodiments, the second illuminator source is deactivated to allow a subsequently activated illuminator source to operate without interference by the second illuminator source. Additionally or alternatively, by deactivating the second illuminator source upon activating another illuminator source, the process may conserve processing and/or power resources by reducing the number of activated components. It should be appreciated that, in other embodiments, the second illuminator source may remain active in conjunction with one or more subsequently activated illuminator sources (e.g., reactivation of the broadest illuminator source).

At block 906, the process 900 includes reactivating the broadest illuminator source. In some embodiments, computing hardware such as one or more controllers and/or processors, is specially configured to generate and/or transmit one or more activation signals to the broadest illuminator source. The activation signal may be configured to cause reactivation of the broadest illuminator source, and/or reinitialization of the broadest illuminator source, once the activation signal is received. As described above, the broadest illuminator source and the second illuminator source (and/or one or more additional illuminator sources) may each differ based on one or more parameter values. As such, reactivation of the broadest illuminator source may cause the field to be affected based on the illumination pattern produced by the broadest illuminator source. In some embodiments, the broadest illuminator source may produce an illumination pattern sufficient for illuminating a field for capturing image data objects sufficiently illuminated utilizing the first and/or second image sensor(s).

At block 908, the process 900 includes capturing, using at least one of the first image sensor and the second image sensor, a third image data object set for processing associated with an image processing operation. In this regard, the third image data object set comprises image data objects illuminated at least by the broadest illuminator source. For example, the broadest illuminator source may be configured to provide sufficient illumination for a majority and/or specific set of fields, focal distances, and/or the like. As such, the field may be illuminated differently in comparison to illumination by the second illuminator source, for example based on a difference in illumination pattern and/or intensity, or the like. As such, the data values of the image data objects within the third image data object set may reflect different data values based on the changed illumination, even if the field has not changed. In this regard, the third image data object set may be utilized to successfully complete an image processing operation (or one or more steps thereof) that could not be successfully completed based on the earlier captured second image data object set using the second illuminator source.

It should also be appreciated that the third image data object set may include image data objects captured by either and/or both of the first image sensor and the second image sensor. For example, in some embodiments, the third image data object set may be captured utilizing only one of the first image sensor and the second image sensor while the broadest illuminator source is active. In other embodiments, the third image data object set is captured utilizing a combination of the first image sensor and the second image sensor. For example, in some embodiments, computing hardware such as one or more controllers and/or one or more processors cause capturing of the third image data object set based on a third predetermined activation pattern between the first image sensor and the second image sensor, where the third predetermined activation pattern may be the same as or different than the predetermined activation pattern utilized to capture the first image data object set and/or the second predetermined activation pattern utilized to capture the second image data object set. In one example embodiment, the first image sensor and second image sensor may be activated, to capture an image data object, in an alternating pattern (e.g., activate first image sensor, activate second image sensor, activate first image sensor, activate second image sensor, and the like). In another example embodiment, the first image sensor and the second image sensor are activated based on another predetermined activation sequence (e.g., a predetermined number of captures for each image sensor before alternating, or a particular sequence of captures associated with the first image sensor and second image sensor). In yet other example embodiments, the computing hardware determines the number of image data objects to capture for the third image data object set by processing one or more image data objects as and/or after each is captured (e.g., capture image data objects from the first image sensor until one or more image parameter values reach a certain threshold, then capture image data objects from the second image sensor). It should be appreciated that, for the third image data object set, any capture sequence may be utilized for capturing any number of image data objects using the first image sensor and/or second image sensor.

In accordance with the above operations, the broadest illuminator source may be used for capturing image data objects for processing until more specialized clarity provided by an alternative illuminator source is required, for example for image data objects captured by a particular image sensor. Similarly, after completion of one or more image processing operations and/or stages thereof, the broadest illuminator source may be reactivated to maximize the likelihood of captured image data objects being sufficient for processing associated with the image processing operation without activation of another illuminator source (e.g., a specialized illuminator source associated with a particular image sensor), thus minimizing flicker produced by the activation and/or deactivation of the illuminator sources. Further, it should be appreciated that the broadest illuminator source activation cycle embodied by process 800 in conjunction with process 900 may be repeated any number of times during the operation of associated computing hardware (e.g., an apparatus). In this regard, the broadest illuminator source may be activated, subsequently deactivated in favor of an alternative illuminator source, and reactivated upon completion of one or more stages of an image processing operation by processing image data objects illuminated by the alternative illuminator source, any number of times as required to complete one or more image processing operations.

FIG. 10 illustrates an example flowchart including additional example operations for flicker control in a multi-sensor environment, specifically for determining an illuminator source (e.g., a first or broadest illuminator source or a second illuminator source) should be activated based on one or more activation determinations, in accordance with at least some example embodiments of the present disclosure. The example operations embody a process (or "method") 1000. In some embodiments, it should be appreciated that the example operations embody a computer-implemented process to be performed by an apparatus, for example the apparatus 100 described with respect to FIG. 1 above, and/or by one or more hardware components, for example those described with respect to FIG. 2 above.

In at least some embodiments, the process 1000 occurs after one or more blocks of the process 800. In this regard, the process 1000 may begin after block 804 as described with respect to FIG. 8, for example as an example implementation of block 806. Further, it should be appreciated that, upon completion of the process 1000, the example process may flow to one or more subsequent operations depicted with respect to FIG. 8, such as optional block 808, or to another block of another sub-process, for example depicted with respect to one of the remaining figures.

In some embodiments, the process 1000 flows to one or more of the operations at block 1002, 1004, and/or 1006. In some embodiments, the process 1000 includes performing one or more of such operations, either in series or in parallel. For example, in some embodiments, an activation determination is satisfied, and thus a new illuminator source should be activated, if any of the blocks 1002, 1004, and/or 1006 are reached.

At block 1002, the process 1000 includes determining activation time data associated with an active illuminator source satisfies an illuminator change time threshold. For example, in some embodiments, at block 1002, the process 1000 includes determining activation time data associated with the broadest illuminator source satisfies an illuminator change time threshold associated with the broadest illuminator source. Alternatively or additionally, in some embodiments at block 1002, the process 1000 includes determining activation time data associated with the second illuminator source satisfies an illuminator change time threshold associated with the second illuminator source.

In this regard, the activation time data may represent a length of time for which the active illuminator source has been active. In some embodiments, one or more processors, controllers, timers, and/or the like are configured to track the activation time data for an active illuminator source. The illuminator change time threshold may represent a threshold length of time for which the active illuminator source may remain active before being deactivated. In this regard, the activation time data may be compared to the illuminator change time threshold to determine whether the active illuminator source should be deactivated. For example, when the activation time data satisfies the illuminator change time threshold (e.g., by exceeding the threshold), the determination may indicate the active illuminator source should be deactivated. In a circumstance where the determination at block 1002 indicates the activation time data satisfies an illuminator change time threshold, the flow may continue to deactivate the active illuminator source.

Additionally or alternatively, at block 1004, the process 1000 includes determining a number of captured frames associated with a captured image data object set satisfies an illuminator change capture threshold. For example, in some embodiments at block 1004, the process 1000 includes determining a number of captured frames associated with a captured image data object set associated with an active illuminator source (e.g., a broadest illuminator source and/or a second illuminator source). Specifically, the number of captured frames may represent a particular captured number of image data objects while the active illuminator source remains active. In some embodiments, various illuminator sources are associated with different illuminator change capture thresholds. Alternatively or additionally, in at least some embodiments, only a subset of a plurality of illuminator sources may be associated with an illuminator change capture threshold (e.g., a second illuminator source may be associated with an illuminator change capture threshold, while a broadest illuminator source is not associated with any such threshold).

In this regard, the illuminator change capture threshold may represent a threshold number of captured image data objects after which the active illuminator source should be deactivated. In some such embodiments, the active illuminator source may become active only for a set number of captures before returning to a deactivated state. For example, when the number of captured frames associated with a captured image data object set satisfies the illuminator change capture threshold (e.g., by exceeding the threshold), the determination may indicate the active illuminator source should be deactivated. In a circumstance where the determination at block 1004 indicates the number of captured frames associated with a captured image data object set satisfies an illuminator change capture threshold, the flow may continue to deactivate the active illuminator source.

Additionally or alternatively, at block 1006, the process 1000 includes processing a most-recent image data object to identify a property value for an image data property associated with the most-recent image data object. The most-recent image data object may represent the image data object most recently captured by a corresponding image sensor (e.g., temporally the most recent image data object). In some embodiments, the most-recent image data object is determined from a specific image sensor (e.g., the most recent image data object from the second image sensor).

In some embodiments, the property value for one or more image data properties is/are determined by processing the most recent image data object based on one or more known image property determination algorithms. For example, the most-recent image data object may be processed utilizing one or more brightness algorithms to determine a brightness property value associated with the most-recent image data object. As yet another example, the most-recent image data object may be processed utilizing one or more white-level algorithms to determine a white-level property value associated with the most-recent image data object. It should be appreciated that any number of property values may be identified by processing the most-recent image data object.

At block 1008, the process 1000 includes determining the property value satisfies an illuminator change image property value threshold. In this regard, the illuminator change image property value may represent a minimum threshold, maximum threshold, or permissible range for a property value associated with an image property of the most-recent image data object. Each image property may be associated with a different illuminator change image property value threshold associated with the image data property. For example, in some embodiments, a brightness image data property is associated with a first illuminator change image property value threshold, and/or a white-level image data property is associated with a second illuminator change image property value threshold. In this regard, the property value and corresponding illuminator change image property value threshold may be compared to determine whether the property value satisfies the illuminator change image property value threshold. In some embodiments, if any property value for the most-recent image data object is determined to satisfy a corresponding illuminator change image property value threshold, (e.g., by exceeding the threshold), the determination may indicate the active illuminator source should be deactivated. In a circumstance where the determination at block 1008 indicates the property value satisfies an illuminator change image property value threshold, the flow may continue to deactivate the active illuminator source. In some embodiments, the process 1000 includes identifying the illuminator change image property value threshold, for example from one or more memory devices, and/or determining the illuminator change image property value threshold for one or more image data properties.

It should be appreciated that, in a circumstance where one or more of the determinations at blocks 1002, 1004, and/or 1008 indicate the active illuminator source should be deactivated, the flow may continue to deactivate the active illuminator source. For example, in some embodiments, flow returns to optional block 808 as depicted and described above with respect to FIG. 8, for example to deactivate the broadest illuminator source and subsequently activate the second illuminator source. Alternatively, in some embodiments, flow returns to block 904 as depicted and described above with respect to FIG. 9, for example to deactivate the second illuminator source and subsequently reactivate the broadest illuminator source. In this regard, it should be appreciated that the activation determinations described with respect to FIG. 10 may be based on configuration settings of computing hardware, one or more components, and/or the like, to control an activation cycle of the illuminator sources within particular embodiments described herein.

CONCLUSION

It should be appreciated that the example implementations described herein are each non-limiting examples of various embodiments of the present disclosure. In this regard, one or more enhancements implemented in the various embodiments may be provided any combination. Additionally or alternatively, in some embodiments, one or more components may be provided with modifications as described herein.

For example, some embodiments may provide for any number of illuminator sources optics and/or corresponding imaging assemblies. In this regard, other embodiments of the present disclosure may include any number of illuminator optics, image sensors, and/or the like. Further, in some embodiments, the various number of illuminator sources and/or image sensors may be arranged in any particular manner within the apparatus without deviating from the example embodiments of the present disclosure.

The embodiments disclosed herein have been described with certain example configurations and/or implementation details. It should be appreciated that, in other embodiments, for example, components may be embodied by other materials known I the art for creating such components, and/or structural and/or logical equivalents. Further, it should be appreciated that embodiments may include any number of known structural elements for connecting and/or otherwise securing the various components described, and/or for establishing communication between the various components and/or sub-components thereof (e.g., for securing one or more components to one or more circuit boards enabling communication between the various components therein) without deviating from the scope and spirit of the present disclosure.

Further, while this specification contains many specific implementation details, these should not be construed as limitations on the scope of any disclosure or of what may be claimed, but rather as descriptions of features specific to particular embodiments of the particular disclosure. Certain features that are described herein in the context of separate embodiments can also be implemented in combination within a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed or disclosed combination can, in some cases, be excised from the combination, and the claimed combination may be directed to a subcombination or variation of a subcombination thereof.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them. For example, embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for flicker control in a multi-sensor environment, the computer-implemented method comprising:
    activating a broadest illuminator source and at least a second illuminator source, wherein the broadest illuminator source is associated with a first image sensor and the second illuminator source is associated with a second image sensor;
    capturing, using at least one of the first image sensor and the second image sensor, an image data object set processable utilizing an image processing operation; and
    determining, based on one or more activation determinations, the activation of the second illuminator source.

2. The computer-implemented method of claim 1, wherein the broadest illuminator source is deactivated in response to determining that the second illuminator source should be activated.

3. The computer-implemented method of claim 1, wherein the activation determinations associated with the second illuminator source comprises a length of time since activation of the broadest illuminator source.

4. The computer-implemented method of claim 1, wherein the activation determinations associated with the second illuminator source comprises a number of captured image data objects.

5. The computer-implemented method of claim 1, wherein the activation determinations associated with the second illuminator source comprises processing one or more of the captured image data objects in the image data object set.

6. The computer-implemented method of claim 1, wherein capturing, using at least one of the first image sensor and the second image sensor, a second image data object set processable utilizing based on the image processing operation.

7. The computer-implemented method of claim 6, wherein the second image data object set comprises image data objects illuminated by the second illuminator source.

8. The computer-implemented method of claim 1, the computer-implemented method further comprising:
determining that the broadest illuminator source should be reactivated based on a second activation determination set comprises one or more activation determinations.

9. The computer-implemented method of claim 8, wherein the activation determinations comprises one or more determinations regarding a length of time since activation of the second illuminator source, and/or a length of time since deactivation of the broadest illuminator source.

10. The computer-implemented method of claim 8, wherein the activation determinations comprises one or more determinations regarding a number of captured image data objects while the second illuminator source is activated.

11. The computer-implemented method of claim 8, wherein the second illuminator source is deactivated in response to determining that the broadest illuminator source should be reactivated.

12. An apparatus for flicker control in a multi-sensor environment, the apparatus comprising a processor configured, based on computer-coded instructions, to:
activate a broadest illuminator source and at least a second illuminator source, wherein the broadest illuminator source is associated with a first image sensor and the second illuminator source is associated with a second image sensor;
capturing, using at least one of the first image sensor and the second image sensor, an image data object set processable utilizing an image processing operation; and
determining, based on one or more activation determinations, the activation of the second illuminator source.

13. The apparatus of claim 12, wherein the broadest illuminator source is deactivated in response to determining that the second illuminator source should be activated.

14. The apparatus of claim 12, wherein capturing, using at least one of the first image sensor and the second image sensor, a second image data object set for processing based on the image processing operation.

15. The apparatus of claim 14, wherein the second image data object set comprises image data objects illuminated by the second illuminator source.

16. The apparatus of claim 12, the apparatus further configured to:
determine the broadest illuminator source should be reactivated based on a second activation determination set comprising one or more activation determinations.

17. The apparatus of claim 12, wherein the second illuminator source is deactivated in response to determining that the broadest illuminator source should be reactivated.

18. A computer program product comprising at least one non-transitory computer-readable medium having computer-readable program instructions stored therein, the computer-readable program instructions comprising instructions, which when performed by an apparatus, are configured to cause the apparatus to at least perform:
activate a broadest illuminator source and at least a second illuminator source, wherein the broadest illuminator source is associated with a first image sensor and the second illuminator source is associated with a second image sensor;
capturing, using at least one of the first image sensor and the second image sensor, an image data object set processable utilizing an image processing operation; and
determining, based on one or more activation determinations, the activation of the second illuminator source.

19. The computer program product of claim 18, are configured to cause the apparatus to:
deactivate the broadest illuminator source in response to determining that the second illuminator source should be activated.

20. The computer program product of claim 18, are configured to cause the apparatus to:
reactivate the broadest illuminator source based on a second activation determination set comprising one or more activation determinations.

* * * * *